United States Patent
Ortiz Egea et al.

(10) Patent No.: US 11,941,787 B2
(45) Date of Patent: Mar. 26, 2024

(54) DENOISING DEPTH DATA OF LOW-SIGNAL PIXELS

(71) Applicant: Microsoft Technology Licensing, LLC, Redmond, WA (US)

(72) Inventors: Sergio Ortiz Egea, San Jose, CA (US); Augustine Cha, Honolulu, HI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 208 days.

(21) Appl. No.: 17/445,659

(22) Filed: Aug. 23, 2021

(65) Prior Publication Data

US 2023/0074482 A1 Mar. 9, 2023

(51) Int. Cl.
*G06T 5/00* (2006.01)
*G01S 17/894* (2020.01)
*G06T 5/20* (2006.01)
*G06T 7/521* (2017.01)

(52) U.S. Cl.
CPC ............ *G06T 5/002* (2013.01); *G01S 17/894* (2020.01); *G06T 5/20* (2013.01); *G06T 7/521* (2017.01)

(58) Field of Classification Search
None
See application file for complete search history.

(56) References Cited

U.S. PATENT DOCUMENTS

| | | | |
|---|---|---|---|
| 10,397,552 B2* | 8/2019 | Van Nieuwenhove | ....................... H04N 13/207 |
| 11,520,052 B2* | 12/2022 | Ortiz Egea | ............. G01S 17/36 |
| 11,646,009 B1* | 5/2023 | Chhetri | ................... G10L 15/16 704/232 |
| 11,734,801 B2* | 8/2023 | Ortiz Egea | ............... G06T 5/20 382/106 |
| 2016/0205378 A1* | 7/2016 | Nevet | .................. H04N 25/704 348/47 |
| 2020/0010356 A1* | 1/2020 | Fotheringham | ......... C03C 3/078 |
| 2021/0110700 A1* | 4/2021 | Harman | ................. G06N 20/00 |
| 2021/0405199 A1* | 12/2021 | Ortiz Egea | ........... G01S 17/894 |

(Continued)

OTHER PUBLICATIONS

O'Sullivan et al. "Time of Flight System Design—Part 1: System Overview", Analog Dialog, vol. 55, No. 3—Jul. 2021 (Year: 2021).*

(Continued)

*Primary Examiner* — Randolph I Chu
(74) *Attorney, Agent, or Firm* — Alleman Hall & Tuttle LLP

(57) ABSTRACT

Examples are provided relating to recovering depth data from noisy phase data of low-signal pixels. One example provides a computing system, comprising a logic machine, and a storage machine holding instructions executable by the logic machine to process depth data by obtaining depth image data and active brightness image data for a plurality of pixels, the depth image data comprising phase data for a plurality of frequencies, and identifying low-signal pixels based at least on the active brightness image data. The instructions are further executable to apply a denoising filter to phase data of the low-signal pixels to obtain denoised phase data and not applying the denoising filter to phase data of other pixels. The instructions are further executable to, after applying the denoising filter, perform phase unwrapping on the phase data for the plurality of frequencies to obtain a depth image, and output the depth image.

20 Claims, 15 Drawing Sheets

(56) References Cited

U.S. PATENT DOCUMENTS

| | | | | |
|---|---|---|---|---|
| 2022/0114744 | A1* | 4/2022 | Kang | G06V 10/30 |
| 2022/0292705 | A1* | 9/2022 | Friedman | G06V 10/82 |
| 2023/0047584 | A1* | 2/2023 | Bruza | G01N 21/474 |
| 2023/0074482 | A1* | 3/2023 | Ortiz Egea | G06T 5/002 |
| 2023/0080693 | A1* | 3/2023 | Hu | G06T 5/50 |
| | | | | 382/275 |
| 2023/0127374 | A1* | 4/2023 | Painchaud-April | |
| | | | | G01N 29/0654 |
| | | | | 73/633 |
| 2023/0168081 | A1* | 6/2023 | Gu | G06T 7/85 |
| | | | | 356/603 |

OTHER PUBLICATIONS

Chuchvara, et al., "A Speed-Optimized RGB-Z Capture System with Improved Denoising Capabilities", In Proceedings of SPIE, Feb. 25, 2014, pp. 1-13.

"Invitation to Pay Additional Fees Issued in PCT Application No. PCT/US22/035396", dated Oct. 28, 2022, 11 Pages.

"International Search Report and Written Opinion Issued in PCT Application No. PCT/US22/035396", dated Dec. 19, 2022, 17 Pages.

\* cited by examiner

DENOISING DEPTH DATA OF LOW-SIGNAL PIXELS

BACKGROUND

Depth sensing systems, such as time-of-flight (ToF) cameras, may be used to produce a depth image of an environment, with each pixel of the depth image representing a distance to a corresponding point in the environment. In ToF imaging, a distance to a point on an imaged surface in the environment is determined based on a length of a time interval in which light emitted by the ToF camera travels out to that point and then returns back to a sensor of the ToF camera. The raw data collected at the depth sensor is processed to produce a depth image.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

One example provides a computing system, comprising a logic machine, and a storage machine holding instructions executable by the logic machine to process depth data by obtaining depth image data and active brightness image data for a plurality of pixels, the depth image data comprising phase data for a plurality of frequencies, and identifying low-signal pixels based at least on the active brightness image data. The instructions are further executable to process depth data by applying a denoising filter to phase data of the low-signal pixels to obtain denoised phase data and not applying the denoising filter to phase data of other pixels. The instructions are further executable to, after applying the denoising filter, perform phase unwrapping on the phase data for the plurality of frequencies to obtain a depth image, and output the depth image.

DETAILED DESCRIPTION

Figure 1A:
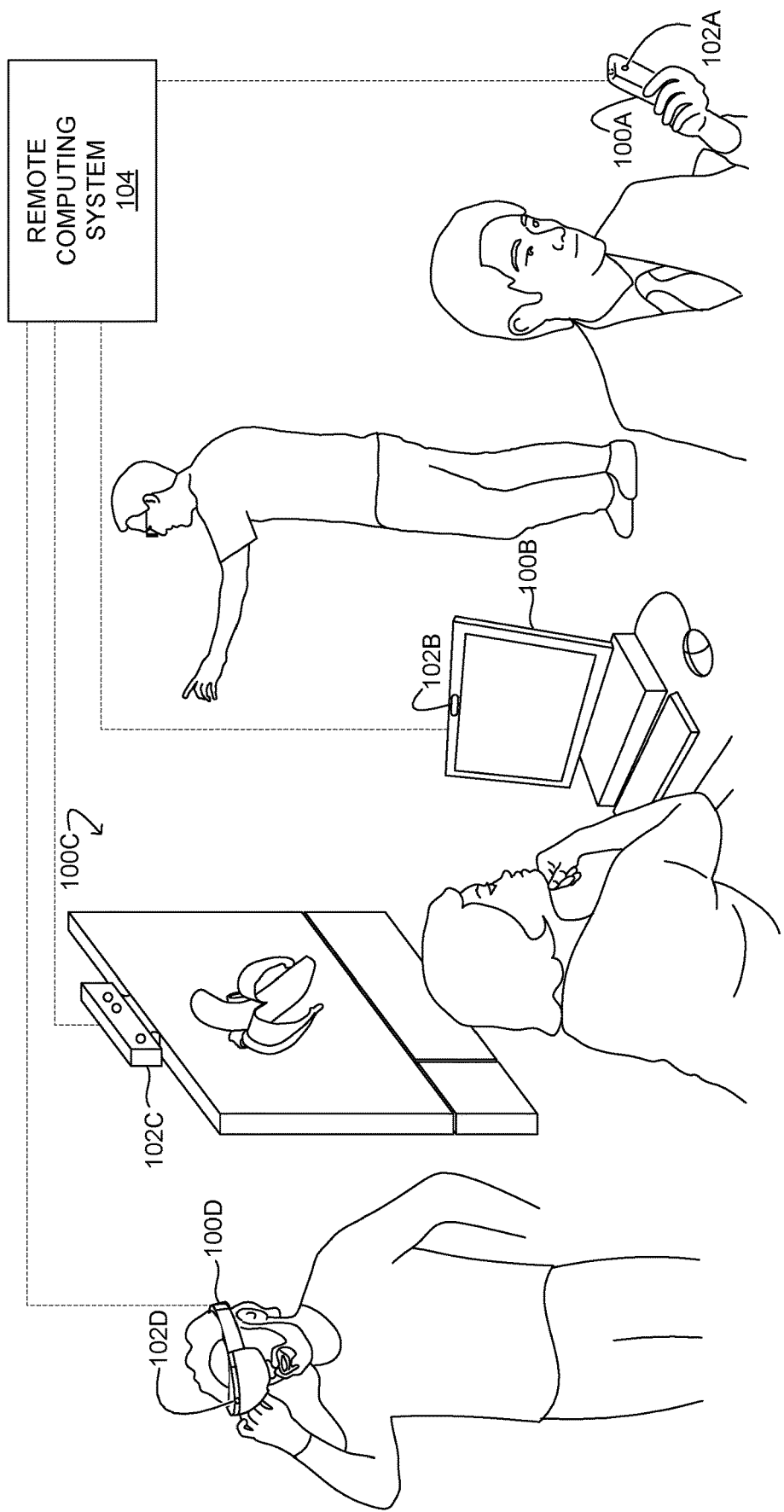
FIGS. 1A-1B show example electronic devices comprising time-of-flight (ToF) cameras.

As mentioned above, time-of-flight (ToF) depth cameras measure, for each sensor pixel of a depth image sensor, a length of a time interval for light emitted by the depth camera to return back to the sensor pixel. As reflectivity may vary across objects in a scene, some pixels may sense low intensity signals in some instances. Further, depth image sensor pixels may be sensitive to crosstalk errors, where photoelectrons captured at one pixel diffuse toward and are collected at neighboring pixels. Low reflectivity, crosstalk errors, and/or other sources of noise may lead to instances of low signal to noise ratio, also referred to as low-signal.

In view of such noise issues, filtering is commonly performed by a ToF depth camera on raw depth image data prior to performing other data processing, such as phase unwrapping that is used in phase-based ToF imaging. Phase-based ToF imaging is a variant of ToF imaging in which depth is computed based on the phase shift of amplitude modulated light reflected back from a subject. In phase-based ToF imaging, a light source on the ToF camera illuminates a scene with amplitude modulated light. The phase shift in the light reflected back from the subject is proportional to the subject's distance modulo the wavelength of the modulation frequency. However, due to the periodic nature of the modulated light, the measured total phase repeats (or wraps) every $2\pi$. Since the number of wrappings cannot be directly measured via a phase based ToF pixel, the total phase, and thus the actual distance related to the measurement, is ambiguous. To address this issue, two or more different modulation frequencies can be used to increase the range of unambiguity, allowing the phase information to be "unwrapped" for the accurate determination of distance. Phase unwrapping is a way to disambiguate the phase data by illuminating the scene with amplitude-modulated light of a plurality of different frequencies, as the distance ambiguities are different for each frequency of illumination light. The ToF image data acquired by a ToF camera, also referred to as depth image data, comprises phase data for two or more frequencies.

Accurate phase unwrapping may be difficult due to noise in the collected phase information. This can lead to incorrect unwrapping, and thus relatively large errors in a determined distance at a pixel. As such, depth engine pipelines (processing pipelines used to process depth image data) include procedures to first calibrate the signal and filter the data prior to performing phase unwrapping. For example, a depth sensor may perform multi-frequency phase collection to obtain noisy data for a plurality of modulation frequencies. Then, the noisy data is processed via signal calibration correction and denoising. Denoising processes generally utilize a N×N kernel of pixels around a pixel being denoised, and thus are computationally expensive compared to pixel-wise operations. After denoising, the total phase can be calculated from the complex signal, followed by phase unwrapping and crosstalk correction. Additionally, an intensity image may be obtained from the denoised data via active brightness averaging. The final depth and intensity images are then output, e.g., for use in gesture identification, AR applications, or other user services.

As processing depth image data may be computationally intensive, a distributed architecture may be utilized to move heavy compute from a low power depth camera device, which may be located on a battery-powered mobile device in some examples, to a remote computing system with more power. While a distributed depth engine may move heavy compute to a remote system, transmitting phase data may be challenging with low-bandwidth connections, due to the quantity of data transferred per frame (e.g. two images (active brightness image and phase image) for each modulation frequency) and a frame rate of the camera (e.g. 45-90 Hz in some examples).

However, depth images may comprise low-signal pixel regions where the signal to noise ratio is so poor that there is a relatively low probability of unwrapping correctly, even with standard signal calibration and filtering procedures. In these instances, performing phase unwrapping may not provide meaningful information. One option is to unwrap with errors, which may be an inefficient use of resources, particularly on an untethered depth camera device with limited computational power. Another option is to neglect such low-signal pixel regions. This approach may conserve resources on a low power depth camera device. Further, in the case of a distributed depth engine, high signal data can be selectively transmitted while low-signal data is neglected, which may conserve bandwidth. However, in images containing a relatively high number of low-signal pixels, neglecting low-signal depth image data may result in unsatisfactory final depth images.

Accordingly, examples are disclosed related to recovering depth data from noisy phase data of low-signal pixels. Upon acquiring phase data and active brightness data, low-signal pixels are identified based on the active brightness data. Then, prior to phase unwrapping, a denoising filter is applied to phase data of the low-signal pixels. In some examples, the denoising filter comprises an unweighted average. After denoising, phase unwrapping is performed on the phase data. The denoising filter can be applied to low-signal pixels and not applied to other pixels. As such, the disclosed examples may provide for efficient recovery of useful depth information from noisy phase data of low-signal pixels. With fewer errors and fewer neglected pixels, the examples may provide better quality depth images than in the absence of the disclosed examples.

As discussed above, a distributed architecture may be utilized to process depth data. While performing denoising on low-signal pixels prior to phase unwrapping may help avoid unwrapping errors, transmitting phase data to a remote system can be challenging (i.e., high bandwidth). Alternatively, denoising the phase data on the depth camera with larger kernels prior to unwrapping/transmission may be compute intensive, while pixel-wise denoising (i.e., 1×1 kernels) may be insufficient to avoid unwrapping errors. Compute intensive denoising on the depth camera may offset the efficiency benefits of a distributed depth engine pipeline.

Accordingly, examples also are disclosed relating to reconstructing phase data from coarse depth data and performing denoising on the reconstructed phase data. In one example, a depth camera acquires noisy phase data and active brightness data. The noisy phase data is unwrapped prior to denoising to obtain coarse depth image data. The coarse depth image data is transmitted with the active brightness data to a remote computing system. At the remote computing system, the coarse depth image data and active brightness data are used to reconstruct the phase data. Then, a denoising filter is applied to the reconstructed phase data. In some examples, low-signal pixels are identified and a denoising filter is selectively applied to phase data of the low-signal pixels. As the phase data is unwrapped prior to transmitting, less data is compressed/transmitted, allowing for lower bandwidth connections. As such, reconstructing phase data at a remote system may enable a remote system to perform denoising operations in a distributed depth processing pipeline, which may provide increased speed and efficiency.

Figure 1B:
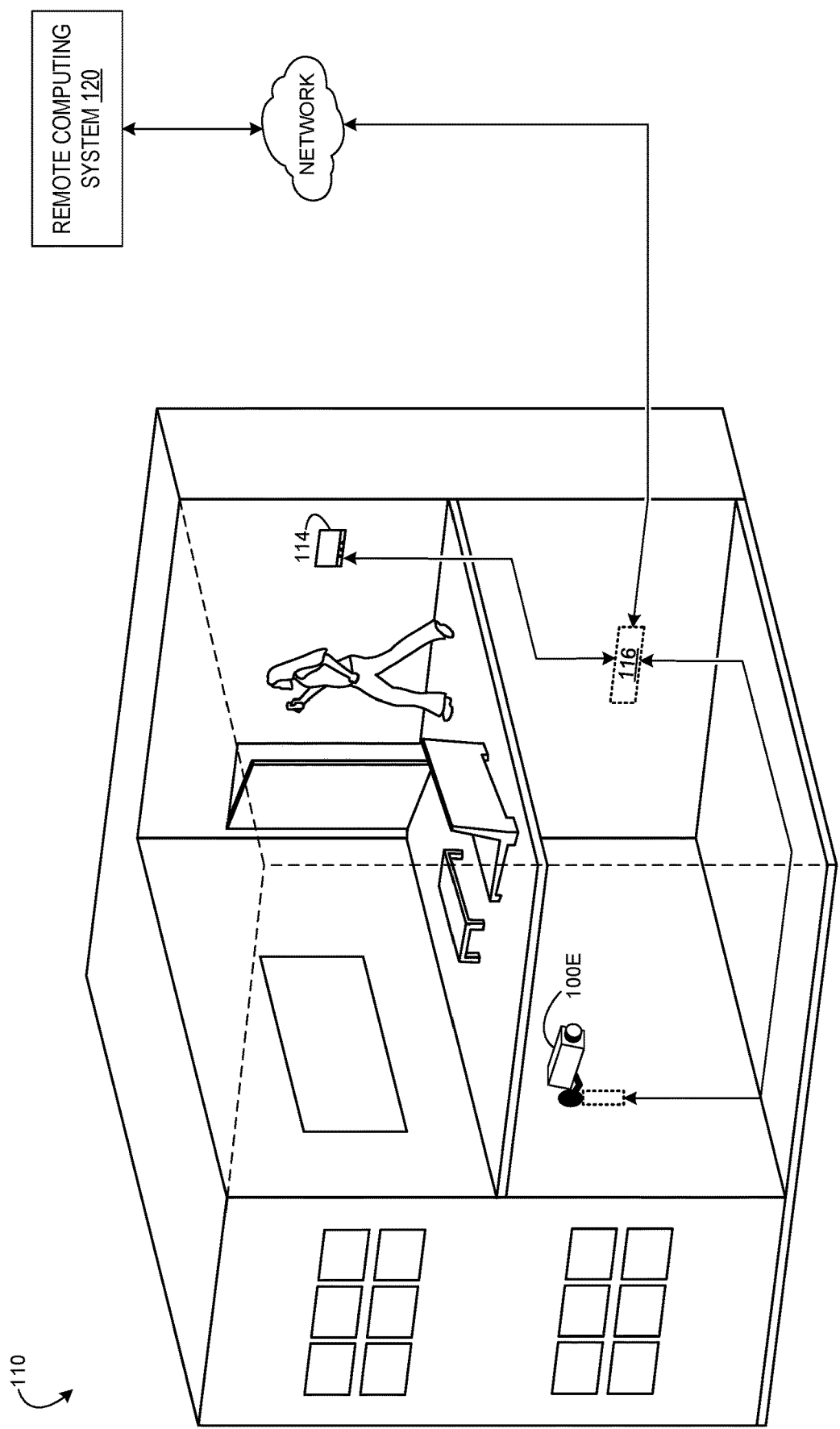

Prior to discussing these examples in detail, FIGS. 1A-1B illustrate various different example electronic devices 100A-E that may employ phase-based ToF depth ToF cameras. Referring first to FIG. 1A, device 100A is a smartphone that includes a ToF camera 102A. Device 100B is a personal computer that includes a ToF web camera 102B. Device 100C is a video game system that includes a peripheral camera system comprising a ToF camera 102C. Device 100D is a virtual-reality headset that includes a camera system comprising a ToF camera 102D. Each device may communicate with a remote computing system 104 to implement a distributed depth pipeline according to the disclosed examples. In combination with remote computing system 104, electronic devices 100A-D may process depth image data utilizing a distributed depth engine pipeline. Remote computing system 104 may comprise any suitable computing system, such as a cloud computing system, a PC, a laptop, a phone, a tablet, etc.

FIG. 1B shows an example use environment 110 including a security camera 100E comprising a ToF camera. Security camera 100E sends data to a remote computing system 120 via a communication hub 116. Remote computing system 120 may comprise any suitable computing system, e.g., an internet-of-things (IoT) endpoint device, a cloud computing system, an enterprise system, a networked PC, or a virtual machine implemented on a cloud computing system. Communication hub 116 also connects to other IoT devices, such as a thermostat 114. In combination with communication hub 116 and/or remote computing system 120, security camera 100E may process depth image data by denoising low-signal pixels within a distributed depth engine pipeline.

Figure 2:
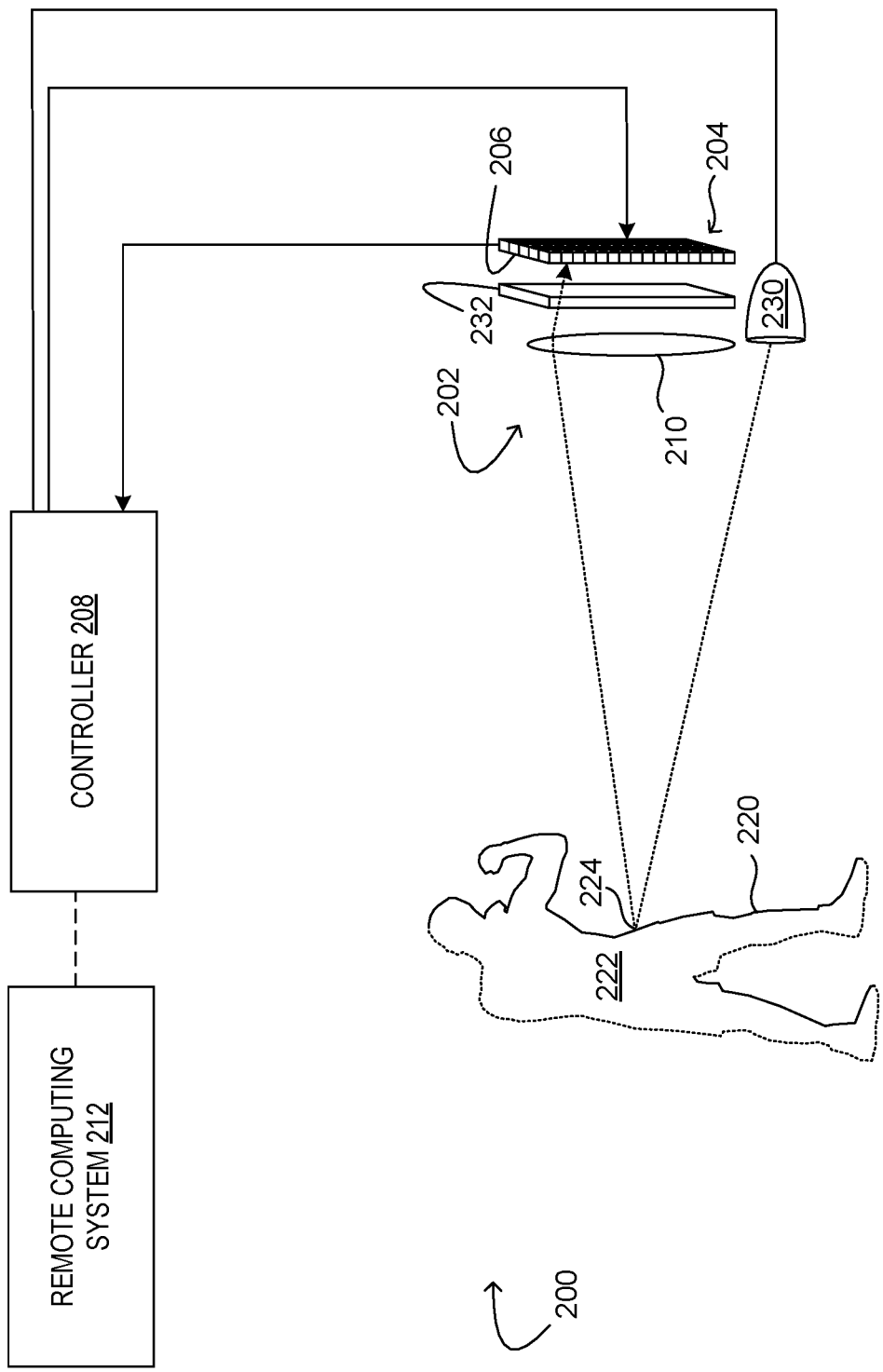
FIG. 2 shows aspects of an example ToF camera system.

FIG. 2 shows a schematic depiction of an example phase-based ToF depth imaging system 200 including a ToF camera 202. ToF camera 202 includes a sensor array 204 comprising a plurality of ToF pixels 206 each configured to acquire light samples that capture phase data, a controller 208, and an objective lens system 210. In some examples, objective lens system 210 may be omitted. Objective lens system 210 is configured to focus an image of at least one surface 220 of a subject 222 onto sensor array 204. Controller 208 is configured to gather and process data from ToF pixels 206 of sensor array 204 and thereby construct a depth image. Controller 208 may comprise executable instructions (e.g. software, firmware and/or hardware) to perform denoising and/or phase unwrapping, as described below. Controller 208 may be implemented across one or more computing devices. Controller 208 may communicate with a remote computing system 212 to perform depth image processing in accordance with the distributed depth image processing pipeline examples disclosed herein. Examples of hardware implementations of computing devices configured to perform phase unwrapping are described in more detail below with reference to FIG. 12.

Depth imaging system 200 also includes a modulated light emitter 230, and an analog and/or digitally modulated electronic shutter 232 for sensor array 204 to control the integration of light by the sensor array 204. Modulated light emitter 230 and sensor array 204 may be controlled via controller 208. Modulated light emitter 230 may be configured to emit electromagnetic radiation having any frequency detectable by ToF pixels 206. For example, modulated light emitter 230 may include an infrared (IR) light-emitting diode (LED), laser diode (LD), or any other suitable light source. The amplitude modulated light may be modulated at different frequencies sequentially or simultaneously, e.g., the modulation waveform may comprise a manifold of frequencies.

Sensor array 204 is configured to sample light from modulated light emitter 230 as reflected off surface 220 and back to the camera. Each ToF sensing pixel 206 of sensor array 204 may comprise one or more pixel taps operable to integrate the reflected light signal at different time intervals, from which the phase shift can be determined. Sensor array 204 is controlled, for each modulation frequency, to sample light at plural phase angles of the amplitude-modulated light from the light source, and determine a phase sample for each modulation frequency from the plurality of light samples for the modulation frequency. The phase samples can then be unwrapped to obtain a depth value for each pixel.

As mentioned above, due to the periodic nature of the modulated light, the measured total phase repeats (or wraps) every $2\pi$. For example, given a measured phase $\tilde{\phi}(k)$, the total phase is $\tilde{\phi}(k)+2\pi n(k)$, where $n(k)$, is an integer. Since $n(k)$, cannot be directly measured via a phase based ToF pixel, the total phase, and thus the actual distance related to the measurement, is ambiguous. Thus, in phase-based ToF imaging, there is a limitation on the distance that can be measured (referred to as the unambiguity range) imposed by the modulation frequency. Two or more different modulation frequencies can be used to increase the unambiguity range, and the collected phase shift data is then unwrapped for the accurate determination of distance.

Figure 3:
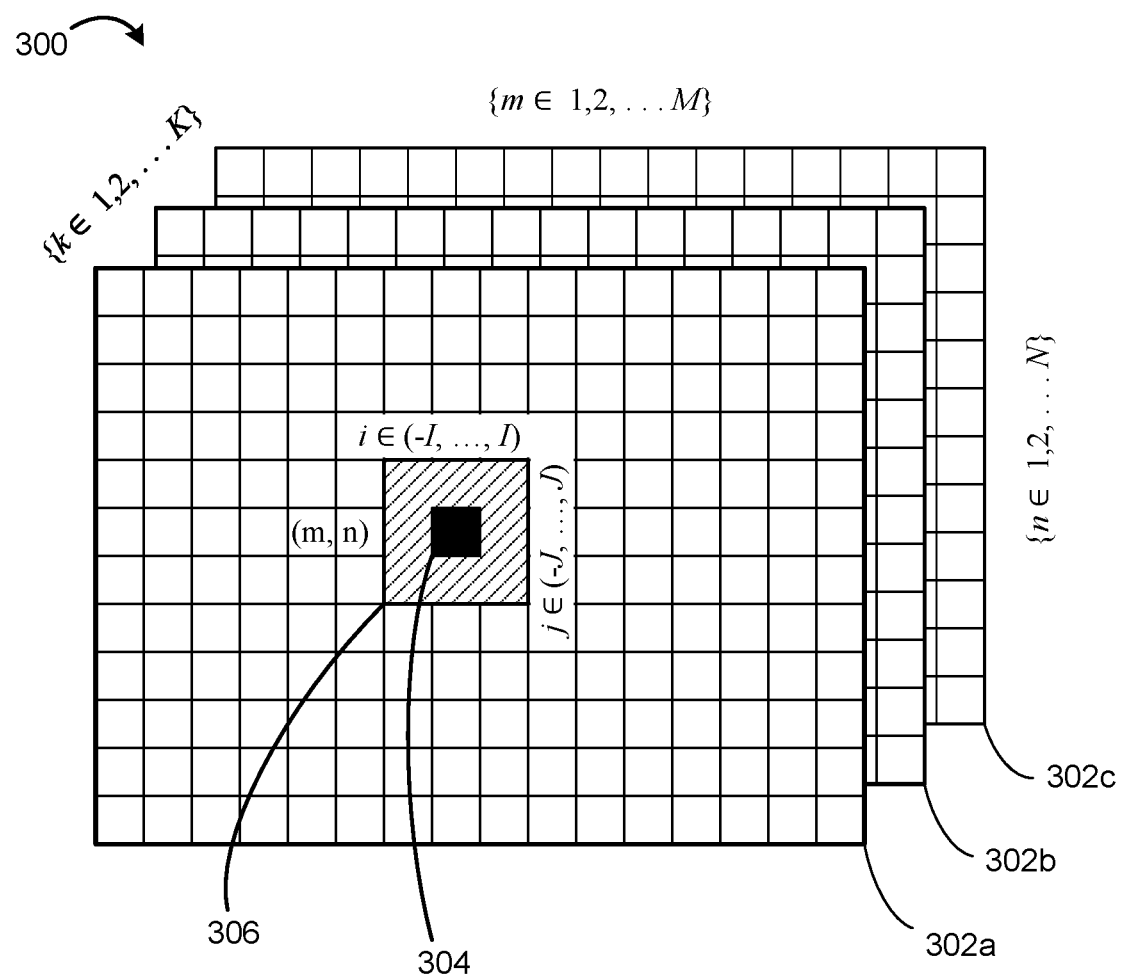
FIG. 3 schematically illustrates example ToF image data for a plurality K of modulation frequencies.

FIG. 3 schematically illustrates example ToF image data 300 for a plurality K of modulation frequencies. Data 300 represents data that can be acquired by depth imaging system 200 during multi-frequency frame collection. In the example shown, the depth data comprises a M×N array of data for each of K modulation frequencies, resulting in M×N grids 302a-c of data, wherein each pixel 304 in each grid represents a measurement acquired at a corresponding illumination light modulation frequency k of K modulation frequencies. For example, the experimental signal collected by pixel 304 at (m,n), for the modulation frequency k is represented by $$\tilde{S}(m,n,k)=\widetilde{AB}_{(m,n,k)}e^{i\tilde{\phi}(m,n,k)}$$

where $\tilde{\phi}(k)$ is the phase, $\{m \in 1, 2 \ldots, M\}$, $\{n \in 1, 2 \ldots, N\}$, and $\{k \in 1, 2 \ldots, K\}$. A tilde accent over a variable indicates that the variable is obtained and/or calculated experimentally, while the absence of a tilde accent indicates variables that correspond to a noise-free situation. While the example depicted in FIG. 3 shows three grids 302a-c, any number of frequencies K≥2 can be used.

The phase of the complex signal $\tilde{\phi}(k)$ may be computed as $$\tilde{\phi}(k)=\arctan 2(\tilde{S}_i(k),\tilde{S}_r(k))$$

where $\tilde{S}_i(k)$ is the imaginary part of the signal collected for frequency k and $\tilde{S}_r(k)$ is the real part of the signal collected. The measured phase is used to compute the depth value associated with the pixel. However, as mentioned above, in phase-based ToF imaging, there is a limitation on the distance that can be measured (referred to as the unambiguity range) imposed by the modulation frequency. Accordingly, a set of K≥2 modulation frequencies k can be used to increase the range of unambiguity, allowing the phase information to be unwrapped for the accurate determination of distance. Phase unwrapping is a way to disambiguate the phase shift data and identify a correct distance value by illuminating the scene with amplitude-modulated light of a plurality of different frequencies, as the distance ambiguities are different for each frequency of illumination light. For example, in a multifrequency method, the amplitude modulated light may comprise a waveform comprising a plurality of frequencies $\vec{f}=\{f_1, f_2, \ldots, f_K\}$. The collection of frequencies comprises frequencies that are chosen to wrap at different locations in the unambiguity range, which extends from distance zero to a point where all three frequencies wrap at a common distance.

The phase and active brightness (AB) per frequency can be estimated using a Discrete Fourier Transform (DFT) projection. In one example, three acquisitions are made with phase-locked phases separated by 120 degrees. Such acquisitions may help increase the signal to noise ratio by canceling part of the harmonics. The DFT projection may be calculated using $$\begin{cases} S_r(k) = \sum_{c=0}^{2} s(c, k) \cdot \cos\ (\varphi + 120 \cdot c) \\ S_i(k) = \sum_{c=0}^{2} s(c, k) \cdot \sin\ (\varphi + 120 \cdot c) \end{cases}$$

where k is the frequency, $\varphi$ is the acquisition phase, $S_r$ is the real part of the signal, and $S_i$ is the imaginary part of the signal, and s(c,k) is the signal collected by the pixel per capture c. Then, two observables (phase and active brightness) are calculated using $$\begin{cases} \phi(k) = \arctan2(S_i(k), S_r(k)) \\ AB(k) = \|S_r(k) + iS_i(k)\| \end{cases}$$

where $\phi$ is the phase and AB is the average active brightness. Based on the uncertainty propagation of the observables, the error is linear for the complex terms $S_r$ and $S_i$ according to $$\begin{cases} \Delta\tilde{S}_r(k) = \sqrt{\sum_{c=0}^{2} [\Delta s(c, k)]^2 \cos^2\ (\varphi + 120 \cdot c)}\ \alpha\ \Delta s \\ \Delta\tilde{S}_i(f) = \sqrt{\sum_{c=0}^{2} [\Delta s(c, k)]^2 \sin^2\ (\varphi + 120 \cdot c)}\ \alpha\Delta s \end{cases}$$

where Δs is the error in the per capture signal. Further, the error is linear for the active brightness and inversely proportional to the active signal for the phase according to $$\begin{cases} \Delta \tilde{\phi}(k) \alpha \frac{\Delta s}{AB} \\ \widetilde{AB}(k) \alpha \Delta s \end{cases}$$

where AB is the active brightness and Δs is the error in the signal. The error is linear in the complex domain. Thus, more smoothing (or a larger kernel size) may be utilized to achieve an equivalent level of precision. As such, it may be advantageous to act on the complex signal.

Figure 4:
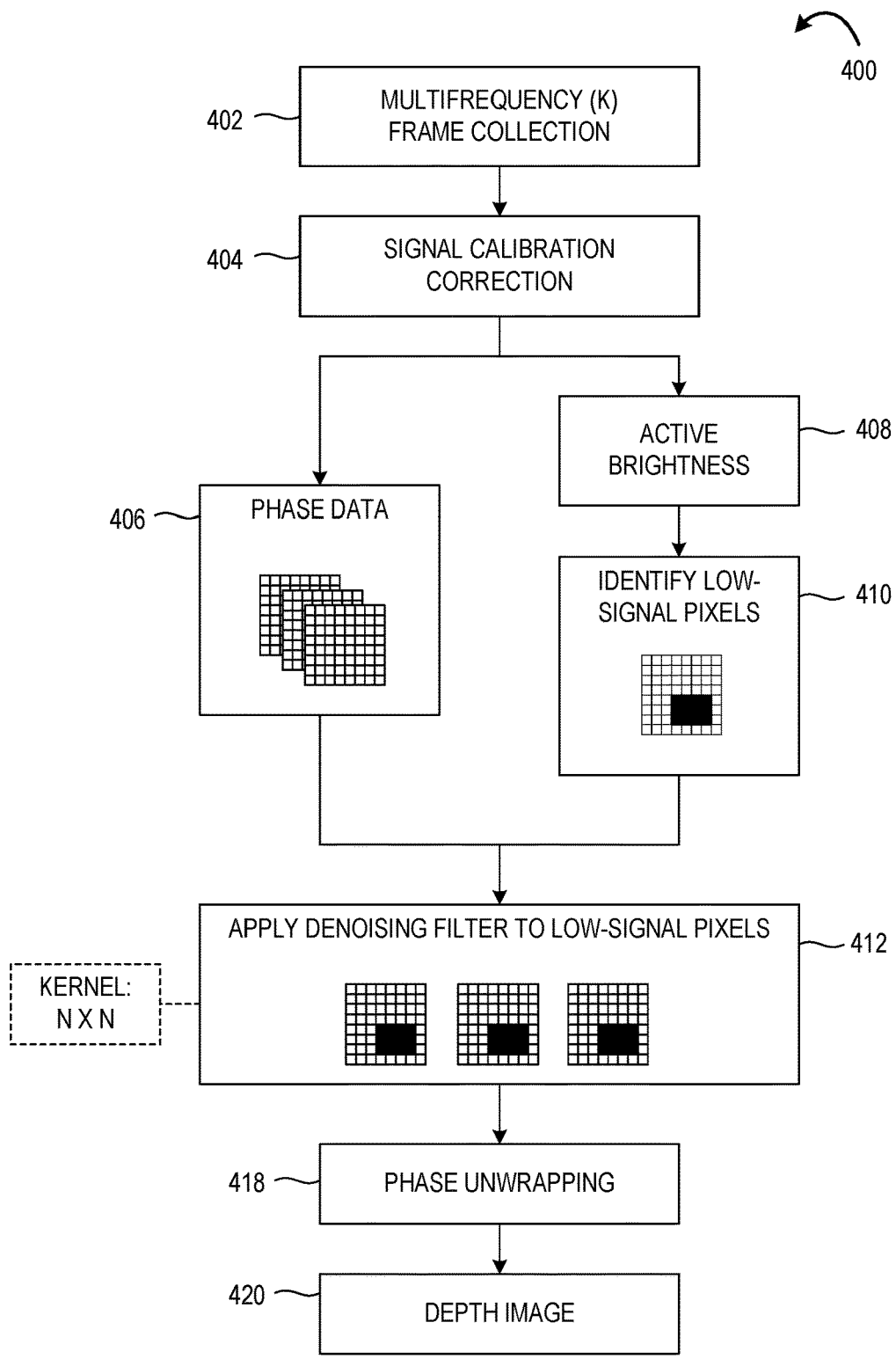
FIG. 4 shows an example method for processing depth data that includes applying a denoising filter to low-signal pixels.

Accordingly, examples are disclosed for performing smoothing and/or denoising of the complex signal. FIG. 4 shows an example method 400 for processing depth image data including identifying and denoising phase data for low-signal pixels. Method 400 may be implemented on a computing system that receives data from a depth camera. In some examples, method 400 may be implemented on a computing device incorporating the depth camera (e.g., a "monolithic" depth engine pipeline).

At 402, the method comprises multifrequency frame collection, where a plurality of phase samples (each comprising a frame of image data) is collected via a ToF image sensor for each of a plurality of amplitude modulation frequencies. At 404, signal calibration correction is performed to obtain phase data 406 and active brightness data 408.

At 410, low-signal pixels are identified based on active brightness data 408. Low-signal pixels may be identified using any suitable metric and/or segmentation operation. For example, the active brightness data for the pixel may be compared to a threshold intensity level. In some examples, a threshold intensity based on a calculated metric is used to separate the data into two or more regions (e.g., high-signal, low-signal, edge regions, etc.). Pixels with active brightness below the intensity threshold may be considered as low-signal. In some examples, the threshold intensity is determined based on a distribution of the active brightness data for the pixels. In some examples, the threshold intensity is based on an energy flux of photons captured at the pixel. In some examples, two or more thresholds may be used for applying denoising kernels of different sizes, as discussed below. Further, in some examples, relatively large noise in the active brightness data may indicate low-signal data (i.e., low signal to noise ratio). As such, in some examples, low-signal pixels are identified based at least upon a standard deviation or variance of the active brightness data.

Segmentation operations can help determine which image regions comprise relatively higher signal-to-noise (i.e., high signal), which regions comprise relatively lower signal-to-noise (i.e., low signal), and which regions are edge regions. Any suitable image metrics may be used, such as variance, standard deviation, average, coefficient of dispersion for intensity and/or depth, or a "cosine" metric, as examples. The coefficient of variation is the standard deviation of the kernel over the average value of the population and is a non-dimensional quantity that provides the variability in relation to the mean of the population. When the data in the kernel is highly variable compared to the mean signal, it can indicate an edge in the case of active brightness, or unwrapping errors in the case of depth. The coefficient of dispersion, defined as the variance of the population over the average, is a dimensional amount and therefore non scale invariant that provides an indication of clustering in the data, i.e. a value over 1 may detect edges in the case of active brightness, or unwrapping errors in the case of depth.

In some examples, a cosine metric is employed for segmentation. The coefficients of the metric can be calculated using $$\alpha(m, n; i, j) = 1 - \frac{\|\tilde{S}(m, n, k) - \tilde{S}(i, j, k)\|^2}{\|\tilde{S}(m, n, k)\|^2 + \|\tilde{S}(i, j, k)\|^2}$$

with $\alpha \in [-1, 1]$ where α(m,n; i,j) is a cross correlation between the complex signal $\tilde{S}$ at pixel (m,n) and pixel (i,j) for frequency k. Then, the square cosine metric can be calculated using $$\bar{\alpha}^2(m, n) = \frac{1}{(2I+1)(2J+1)} \sum_{i=-I}^{I} \sum_{j=-J}^{J} \alpha^2(m, n; i, j)$$

where $\bar{\alpha}^2$ is the cosine metric for pixel (m,n) calculated over a neighborhood of pixels (see, for example, neighborhood 306 of FIG. 3).

Method 400 further comprises, at 412, applying a denoising filter to phase data of low-signal pixels. The denoising filter may comprise an unweighted average, also referred to as a mean filter or box filter. In other examples, the denoising filter may comprise any suitable operation, such as a weighted average, linear smoothing, anisotropic diffusion, non-local means, non-linear filters (e.g, median filter), or wavelet transforms.

Returning to FIG. 3, pixel 304 at (m,n) is within a neighborhood 306 of pixels that may be used in the denoising filter. As such, a denoising filter applied to pixel 304 may comprise a kernel extending over surroundings i∈ {−I, . . . , I} and j∈ {−J, . . . , J}. An unweighted average may be computed for a pixel using $$\tilde{S}(m, n, k) = \sum_{i=-I}^{I} \sum_{j=-J}^{J} \eta(i, j)\tilde{S}_r(i, j, k) + i \sum_{i=-I}^{I} \sum_{j=-J}^{J} \eta(i, j)\tilde{S}_i(i, j, k)$$

where $\tilde{S}_r$ is the real part of the signal, $\tilde{S}_i$ is the imaginary part of the signal, and $\tilde{S}(m,n,k)$ is the enhanced signal which comprises denoised phase data. As such, the denoising filter can be applied to the phase data for each frequency separately.

The denoising filter may comprise any suitable kernel size N×N. In some examples, a kernel size of 3×3 or larger provides adequate performance improvement at modest cost. Larger kernel sizes may provide further performance improvement. However, in some examples, larger kernel sizes may provide diminishing returns, as a large neighborhood surrounding a pixel may include pixels from different regions (e.g., edge regions). As such, in some examples, a kernel size between 11×11 and 15×15 may provide a good balance between performance and computing cost. Still, in other examples where computing cost is less of a concern, larger kernel sizes may be utilized. In some examples, the denoising filter is applied to the low-signal pixels and not applied to other pixels. In other examples, the denoising filter or other filter is also applied to other pixels.

The kernel size of the denoising filter may be determined based upon a local signal to noise ratio. In some examples, smaller kernels are used on regions with relatively higher local signal to noise ratios, and larger denoising kernels are used on regions with relatively lower local signal to noise ratios. For examples, a first intensity threshold may be used to identify low-signal pixels to which a first smaller kernel size is applied, and a second intensity threshold may be used to identify low-signal pixels to which a second larger kernel size is applied. In other examples, a different number of intensity thresholds and kernel sizes may be used.

In some examples, the denoising filter may additionally or alternatively comprise temporal filtering. In such examples, denoising may be performed based at least on previously stored phase data. A temporal denoising filter may comprise a N×N×T kernel, where N is the spatial size and T is the number of frames. Temporal denoising filters that utilize relatively smaller N kernels (e.g., 1×1×T) may provide higher resolution due to less spatial blurring.

In some examples, edge regions are treated with other filters, such as Gaussian blurring. Gaussian blurring generates coefficients radially distributed and spatially dependent according to:

$$e^{-\lambda(\rho)(i^2+j^2)} \text{ with } \begin{cases} i = -I, -I+1, \ldots, I \\ j = -J, -J+1, \ldots, J \end{cases}$$

where $\lambda$ is a parameter responsible for the smoothing. In some examples, the precision, or "jitter," may be controlled and stabilized by making the smoothing coefficient dependent on the ratio $\rho$:

$$\rho(\Delta) = \frac{\Delta_T^\zeta}{\Delta_O^\zeta} \text{ with } \zeta = \frac{1}{2}, 1$$

where $\rho$ is the ratio between the noise target $\Delta_T^\zeta$ and the variability of the depth without filtering $\Delta_O^\zeta$ within the kernel. Here, $\zeta$ denotes either the standard deviation $$\left(\zeta = \frac{1}{2}\right)$$

or the variance ($\zeta=1$).

Continuing in FIG. 4, after denoising, method 400 comprises performing phase unwrapping at 418 to obtain a depth image. As discussed above, performing phase unwrapping after denoising may provide for fewer unwrapping errors for low-signal pixels. After phase unwrapping, a depth image is output at 420. In some examples, the depth image is output together with the active brightness image. The final images may be output, for example, to software applications on a remote computing system, to a device incorporating the ToF camera, or to a cloud computing system.

Figure 5:
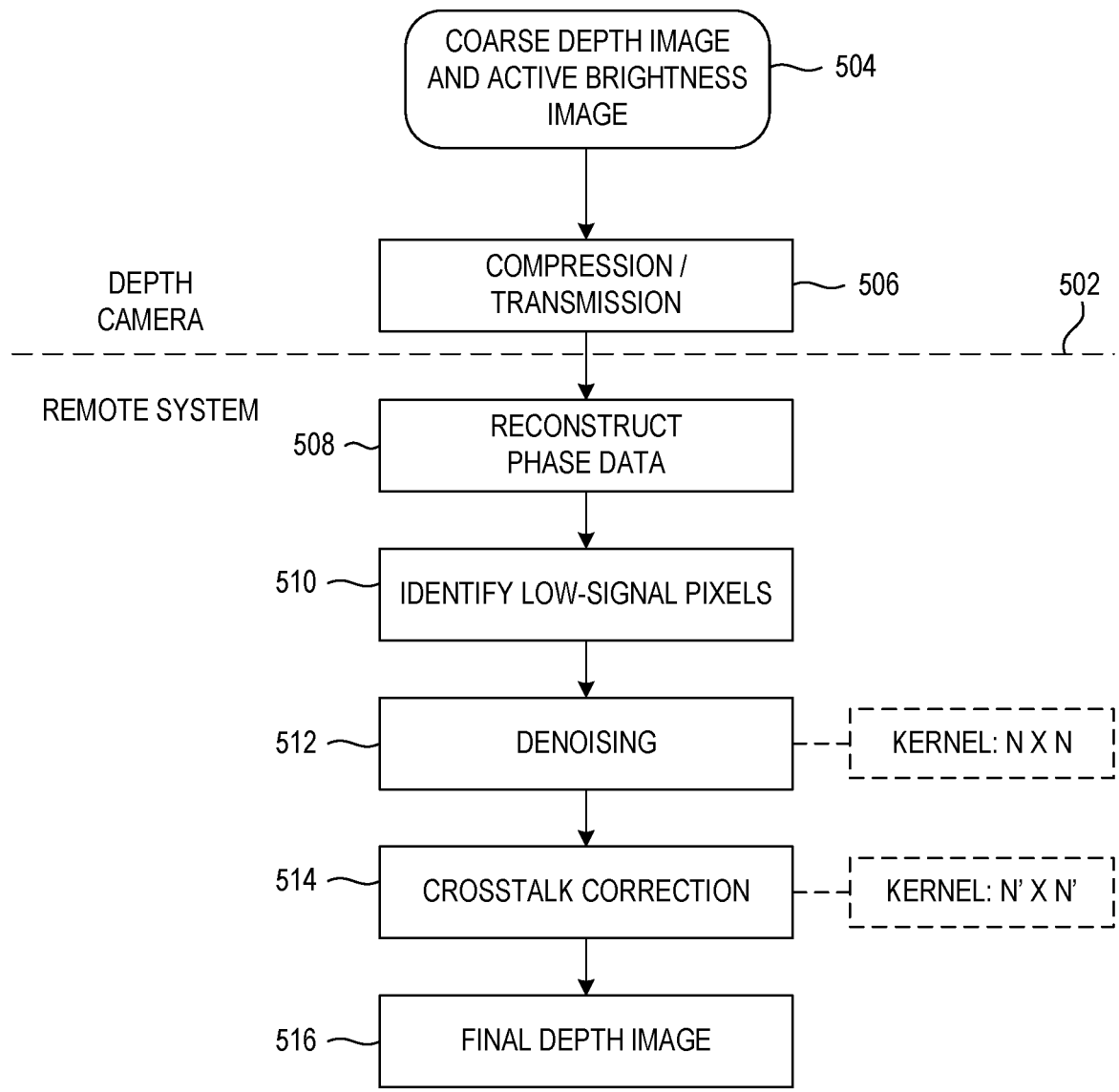
FIG. 5 shows an example distributed depth engine pipeline for processing depth image data.

FIG. 5 schematically shows an example distributed pipeline 500 for processing depth image data to obtain a denoised depth image. In this example, the procedures above dashed line 502 are performed within the ToF camera and/or within the depth camera, while procedures below the line are performed by processing remote to the depth camera. At 504, the pipeline includes generation of coarse depth image data and active brightness image data. The coarse depth image data comprises depth values for each pixel corresponding to unwrapped noisy phase data. The phase unwrapping operations provide a phase number (i.e. a number of wrappings of each modulation frequency) for each pixel, which is then used to compute a depth value for each pixel. The coarse depth image may have more unwrapping errors than a depth image produced using denoised data, as noise can cause a phase measurement to appear in a different phase wrapping than wrapping corresponding to the actual distance. Further, active brightness averaging operations can be performed to obtain an active brightness image.

Continuing with FIG. 5, the coarse depth image and active brightness image are transmitted to a remote computing system at 506. In some examples, the coarse depth image and active brightness image can be compressed to conserve bandwidth. Further, in some examples, the coarse depth image can be segmented based upon a metric, as described above.

At 508, the remote computing system uses the coarse depth image data and the active brightness image data to reconstruct noisy phase data. For example, M×N×k phase data can be reconstructed from a coarse M×N depth image by $$\tilde{S}(m,n,k) = \tilde{S}_r(m,n,k) + i\tilde{S}_i(m,n,k) = \widetilde{AB}(m,n)e^{i\tilde{\phi}(m,n,k)}$$

where $\tilde{S}$ is the reconstructed signal, $\tilde{S}_r$ and $\tilde{S}_i$ are the real and imaginary parts of the signal, $\widetilde{AB}$ is the active brightness transmitted by the device, and $\tilde{\phi}$ is the phase. Here, the tilde accent indicates a noisy signal or noisy value. The phase may be determined from the coarse depth by $$\tilde{\phi}(m, n, k) = \frac{4\pi \tilde{d}(m, n) f_k}{C}$$

where $\tilde{d}$ is the depth and $f_k$ is a frequency of K total frequencies.

In some examples, the frequencies used in reconstruction are different from the frequencies used by the camera during frame collection. For example, a set of virtual frequencies can be introduced and used to reconstruct phase data using the above equations. Further, any suitable plurality K of frequencies may be used. Different frequencies and/or a different number of frequencies may be chosen to produce a more noise resilient solution by maximizing the area, volume, or hypervolume of the Voronoi cell determined by the frequencies.

In some examples, at 510, the distributed pipeline identifies low-signal pixels based on the active brightness image data. Any suitable metric and/or segmentation operation can be used to identify low-signal pixels. At 512, the distributed pipeline performs denoising, which can include convolutional operations, as shown by the depicted N×N kernel. As described above, a denoising filter comprising an unweighted average may be applied. In some examples, the denoising filter is applied to the phase data of low-signal pixels and not applied to other pixels. As 508 may produce phase data for virtual frequencies, the denoising filter may be applied to complex data corresponding to virtual frequencies. Denoising at 512 may additionally or alternatively comprise temporal filtering, as described above.

The distributed pipeline may also perform signal correction on the reconstructed phase data. Signal correction may comprise various denoising processes, such as jitter reduction, smoothing, and/or edge enhancement, some of which can include convolutional operation. Further, the signal correction can include segmentation of the image to process different pixels differently in some examples. After denoising, crosstalk correction is performed at 514 as shown by the depicted N'×N' kernel to generate a final denoised depth image and a final coarse intensity (active brightness) image at 516. The final images may be output, for example, to software applications on the remote computing system, to the device incorporating the ToF camera, or to a cloud computing system.

Using distributed pipeline 500, more compute-intensive processes can be performed remotely rather than on the depth imaging system, which may allow larger kernels to be used in denoising low-signal data. For example, remotely denoising at 512 may use large kernel sizes (N×N Gaussian filters, N≥5), thus improving efficiency of the distributed pipeline. In some examples, the denoising kernel may have a size of between 5×5 and 19×19 pixels. More particularly, the denoising filter may have a size of between 11×11 and 15×15 pixels. Remote processing of denoising may allow for relatively larger kernel sizes to be employed (e.g., between 15×15 to 19×19), compared to other pipelines where denoising is performed on the ToF camera. The use of such larger denoising kernels remotely after phase unwrapping may allow the recovery of depth data that has a higher accuracy compared to the use of a smaller denoising kernel used on the depth camera prior to phase unwrapping.

In some examples, the kernel size may be tuned to provide a desired level of accuracy. As discussed above, a relatively larger or smaller kernel size may be used depending on a local signal to noise ratio, and kernel sizes may be varied on a pixel-by-pixel basis. Further, in some examples, the remote system alternatively or additionally can perform temporal filtering, which may comprise compute-intensive convolutions over T stored coarse depth image frames (e.g., using N×N×T kernels), as described above. The use of a remote system to perform temporal filtering after phase unwrapping may provide advantages over performing temporal filtering on a depth camera prior to phase unwrapping. For example, temporal filtering involves storing a number T of prior image frames. As such, performing temporal filtering prior to phase unwrapping involves the storage of a greater number of individual image frames of depth image data for each depth image, due to having to store phase samples at each modulation frequency, than performing temporal filtering using coarse depth (and coarse intensity) data. Further, a remote computing system may have more available storage than a depth camera, allowing the remote computing system to store a greater number of prior depth images.

In some examples above, a N×N denoising kernel may comprise a box filter that computes an unweighted average over a N×N neighborhood surrounding a given pixel. In other examples, rather than a simple box filter, a more complex filtering approach may be employed for denoising phase data of low-signal pixels. For example, a plurality of relatively smaller kernels may be used instead of a single larger kernel. Each kernel may contribute to the result of two or more different pixels, which may lower an overall computing load for denoising. Any suitable approach may be used. Examples include an extended kernel neighborhood approach, an iterative kernel approach, and/or a collaborative kernel approach, each of which is described in more detail below. Such approaches may provide improvements to the signal to noise ratio above that expected for the kernel size while avoiding use of relatively larger kernels. Additionally, the different filtering approaches may offer different tradeoffs between performance and computational cost dependent on system resources (e.g., parallel processing capability).

Figures 13, 14:
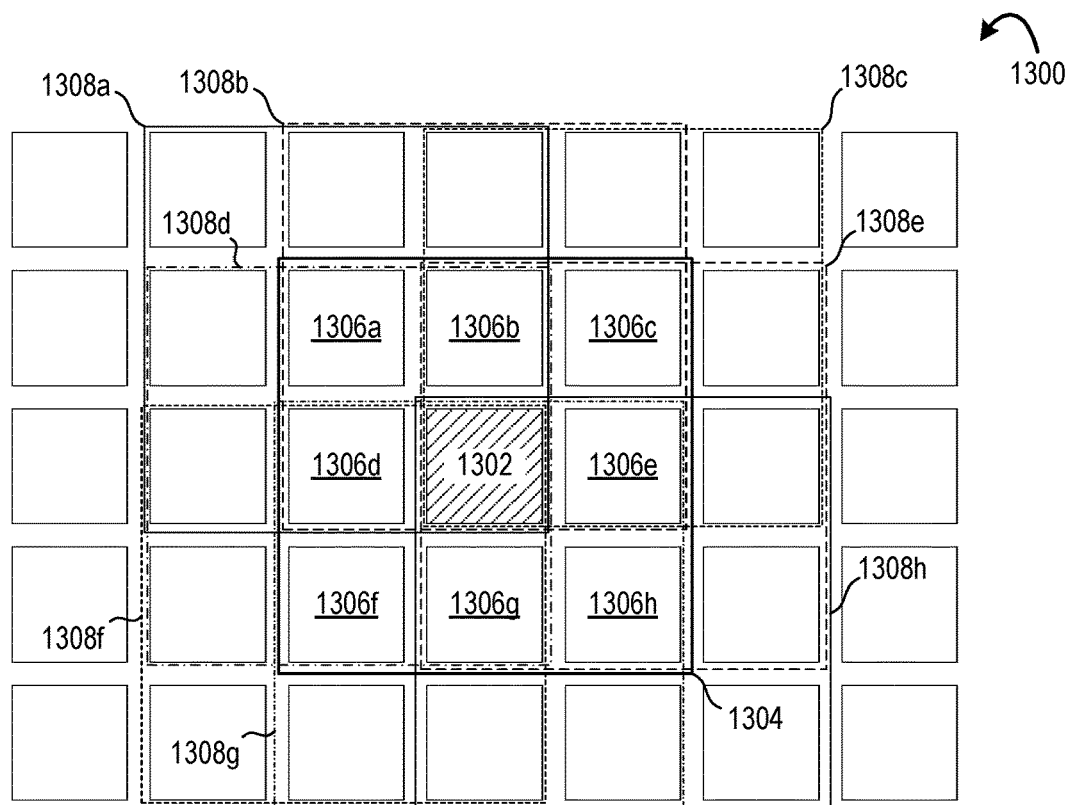
FIG. 13 illustrates an example extended kernel neighborhood approach where multiple kernels contribute to the result of a given pixel.
FIG. 14 shows a matrix of pixel contribution counts for the extended kernel neighborhood approach of FIG. 13 and a corresponding matrix of weighting factors.

One example filtering approach involves the use of an extended kernel neighborhood in which kernels that contain a given pixel (i,j) contribute to the result of the pixel (i,j). FIG. 13 illustrates an extended kernel neighborhood 1300 around pixel 1302, which may also be referred to as the "pixel under test." As shown in FIG. 13, a box 1304 represents a 3×3 kernel applied over the neighborhood surrounding pixel 1302. In the depicted example, the kernel size is 3×3 and includes nine pixels, i.e., pixels 1306a-h and pixel 1302. In the extended kernel neighborhood approach, every kernel that includes a given pixel (e.g., pixel 1302) is included in the signal averaging for that pixel. In the depicted example, nine different 3×3 kernels include pixel 1302 corresponding to kernels centered on each of the nine pixels in neighborhood 1304. These nine kernels are represented by boxes 1308a-h—corresponding to neighborhoods around pixels 1306a-h—and box 1304. As each of the nine kernels are computed, the results contribute to the result of pixel 1302. Pixel 1302 is contained in nine kernels and contributes to the result nine times. Other pixels within the 5×5 extended kernel neighborhood 1300 around pixel 1302 contribute 1, 2, 3, 4, or 6 times each depending on the number of kernels that contain the pixel, as shown in matrix 1400 in FIG. 14. In this manner, a 5×5 Gaussian blur can be achieved with 3×3 kernels and relatively few iterations. Any suitable kernel size can be used in the extended kernel neighborhood. In general, using N×N kernels in the extended kernel neighborhood approach is effectively equivalent to applying a Gaussian blur filter with size (2N−1)×(2N−1). Thus, the extended kernel neighborhood approach may help reduce the blur kernel size generally for signal to noise ratio improvement. This may help overcome problems associated with larger kernels while preserving detail due to blur.

In practice, the extended kernel neighborhood approach may be employed without incurring significant additional cost since a smaller kernel is applied once per pixel. Further, the signal to noise ratio of the extended kernel neighborhood may be enhanced compared to the signal to noise ratio expected for the kernel size used. For example, as the 3×3 kernel contains nine pixels, the standard maximum signal to noise ratio enhancement is expected to be a factor of 3. However, by using 3×3 kernels in the extended kernel neighborhood approach, in an experiment, the signal to noise ratio enhancement was measured to be a factor of 4.25. Similarly, the standard maximum signal to noise ratio enhancement for 5×5 kernel is a factor of 5 whereas under extended kernel neighborhood approach the signal to noise ratio enhancement was measured to be a factor of 7.35. As such, an increased signal to noise ratio may be achieved without the computational cost associated with larger kernels.

Applying a Gaussian blur kernel over a (2N−1)×(2N−1) extended kernel neighborhood may not achieve the same performance as a box filter applied over the extended kernel neighborhood. One possible solution is to augment the extended kernel neighborhood approach with a matrix operation that applies weighting factors to the pixels. Pixels that are underrepresented in the result of the pixel under test may be given relatively greater weights while pixels that are overrepresented in the result of the pixel under test are given relatively lesser weights. For example, FIG. 14 shows a 5×5 matrix 1400 of relative contributions of pixels in extended kernel neighborhood 1300. The pixel under test (i.e., central pixel 1302) is contained in nine kernels and contributes nine times while other pixels contribute fewer times. As such, a weighting factor matrix 1404 can be constructed where the relative contributions are inverted and normalized to produce the values in the matrix. Thus, the performance of the extended kernel neighborhood approach may be improved via adding an extra weighting operation compared to the same approach but not using the extra weighting operation. In some examples, such as when the Gaussian blur filter is preferred in order to preserve detail, the extra weighting operation can be omitted.

Figure 15:
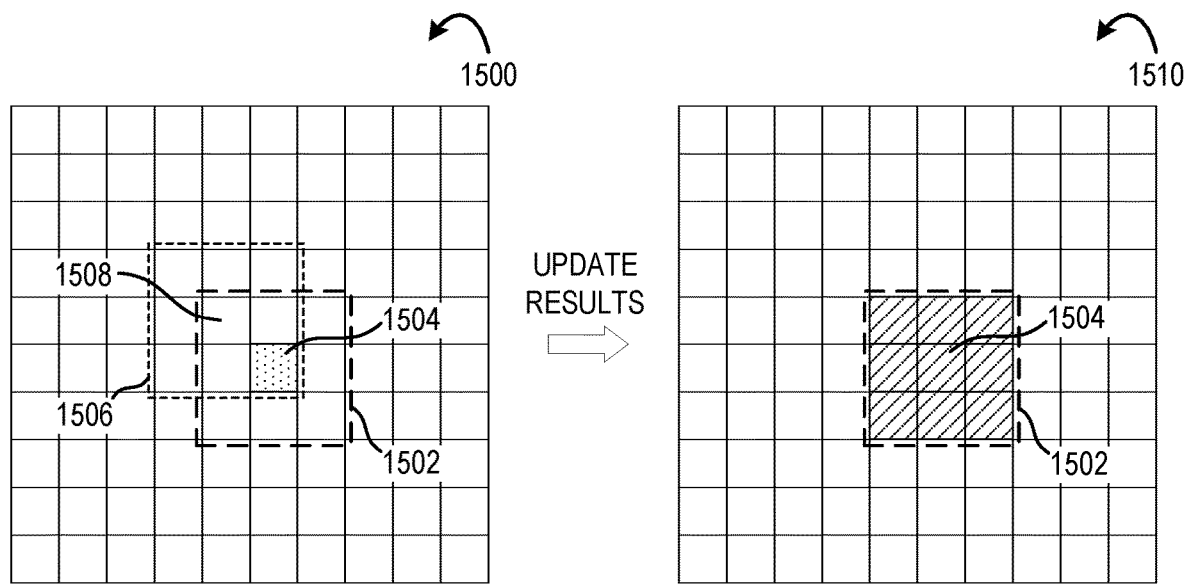
FIG. 15 shows an example iterative kernel approach where pixels are updated via applying a kernel, which is then iteratively applied to the updated results to further refine the pixels.

Another example filtering approach comprises an iterative kernel approach. At a first iteration, a kernel (e.g., a box filter) is applied at each pixel and updates result of the pixel. Then, each subsequent iteration applies the kernel to the updated results to further refine each pixel. FIG. 15 shows an example iterative kernel approach where in a first iteration 1500, a 3×3 box filter is applied over neighborhood 1502 around a pixel 1504 under test. Box filters are also applied to other pixels during the first iteration, for instance, neighborhood 1506 around pixel 1508. As a result of first iteration 1500, the results of the nine pixels in neighborhood 1502 are updated, as indicated by the hashed boxes in second iteration 1510. While other pixels are updated, hashing is omitted for clarity. At second iteration 1510, the box filter is applied to the updated results and the result of pixel 1504 is further refined.

The iterative kernel process may offer a signal to noise enhancement greater than $\sqrt{m \times n}$ but less than $k \cdot \sqrt{m \times n}$, where k is the number of iterations and m×n is the size of the kernel. Any suitable kernel size may be used. In the case of a 3×3 box filter, the standard maximum signal to noise ratio is expected to be enhanced by a factor of 3. The measured enhancement was 4.25 after two iterations and 5.18 after three iterations. Similarly, for a 5×5 box filter, the standard maximum signal to noise ratio is expected to be enhanced by a factor of 5 while the measured enhancement was 7.35 after two iterations and 8.9 after three iterations. It is noted that in the case of a box filter, stopping after two iterations produces a result that is mathematically equivalent to the extended kernel neighborhood described above.

In some examples, a fixed number of iterations are performed (e.g., three iterations). In other examples, the signal to noise ratio can be improved iteratively to reach a desired signal to noise ratio. While performing additional iterations adds compute, the iterative kernel process can be performed in parallel.

Figure 16:
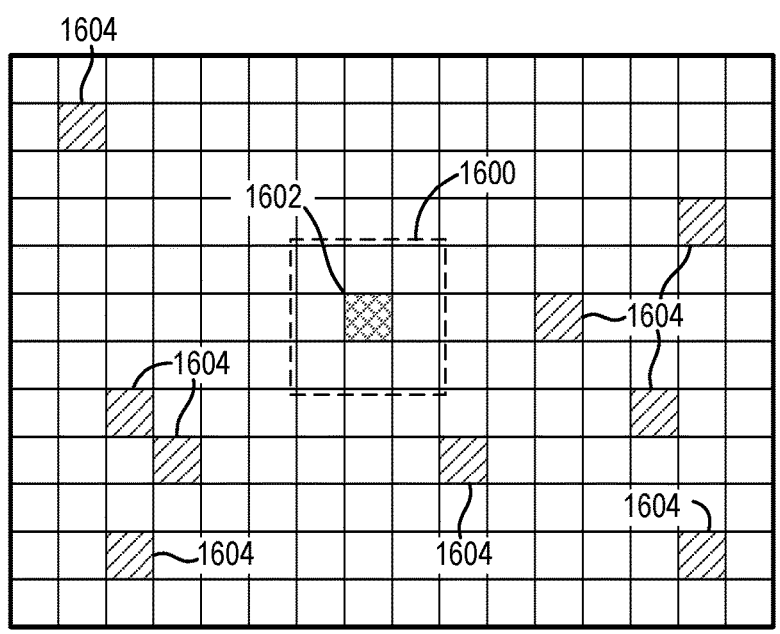
FIG. 16 shows an example collaborative kernel approach where pixels that are similar to a given pixel are used to refine the result of the pixel.

Another example filtering approach comprises a collaborative kernel, which involves using similar pixels to denoise a given pixel, also referred to as a pixel under test. One example collaborative kernel approach is as follows. First, the signal of a pixel under test is enhanced via a local neighborhood approach (e.g., applying a box filter). In the second step, pixels that are similar to the pixel under test are used to produce a denoised version of the pixel under test. For example, as illustrated in FIG. 16, the collaborative kernel may comprise applying a box filter over a neighborhood 1600 of a pixel 1602 under test. The box filter is also applied to update the results of other pixels. Collaborative pixels 1604—determined to be similar to pixel 1602—are then used to further refine the results of pixel 1602. Any suitable similarity function may be used to determine pixel similarity between pixel 1602 and collaborative pixels 1604. For example, a pixel that is close in phase and active brightness to a pixel under test may be considered as a collaborative pixel. In some examples, a cross-correlation can be computed using the complex signal to produce a similarity score.

There may be a relatively large number of similar pixel candidates in a natural scene, which may allow for significant signal to noise ratio enhancement. While there may be no theoretical limit to the signal to noise enhancement achievable, the collaborative kernel approach may be more complex than other example approaches described above. The performance of the collaborative kernel approach may be dependent on factors such as a clean signal, a robust similarity function, and an efficient search. Similar pixels may be spatially separated. Thus, the collaborative kernel approach may comprise searching the entire scene for similar pixels. In some examples, the search may be limited to a subset of pixels in the scene (e.g., a segmented region, an image quadrant, a list of similar pixels from prior frames, etc.). A similarity search may be performed at each frame or may be performed relatively less frequently.

Any of the above-described filtering approaches can be used for denoising low-light pixels while avoiding problems with large kernels. For example, a relatively large kernel (e.g., 9×9) may not perform well near edge regions. However, an iterative kernel process utilizing relatively smaller kernels (e.g., 5×5) may avoid edge region problems while offering similar performance in other regions. As such, the approaches may be used as alternatives to relatively larger kernels (e.g., 9×9, 11×11, 13×13, etc.).

Figure 6:
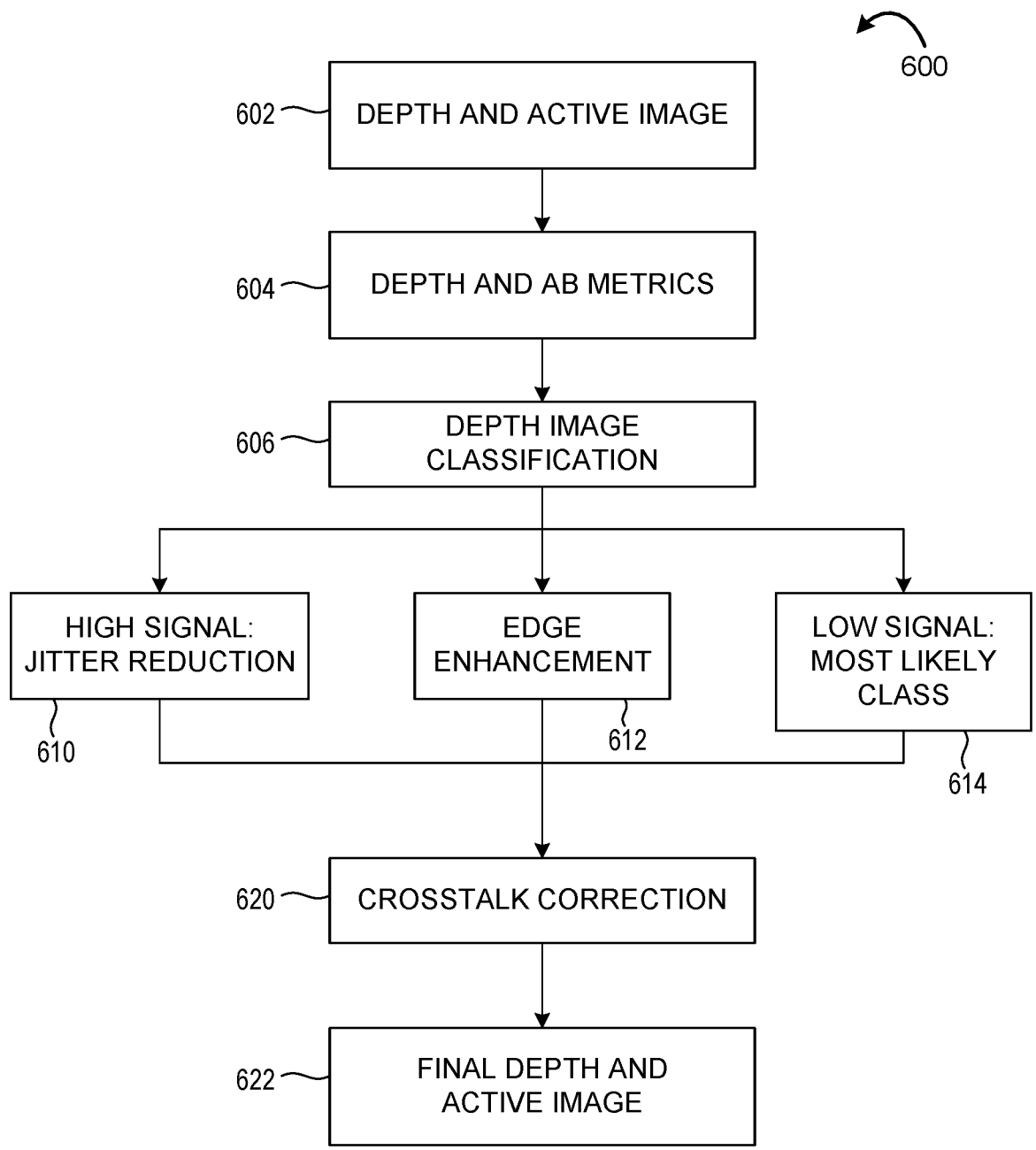
FIG. 6 shows an example processing pipeline for processing depth data by using complex domain data for segmentation.
Figure 7:
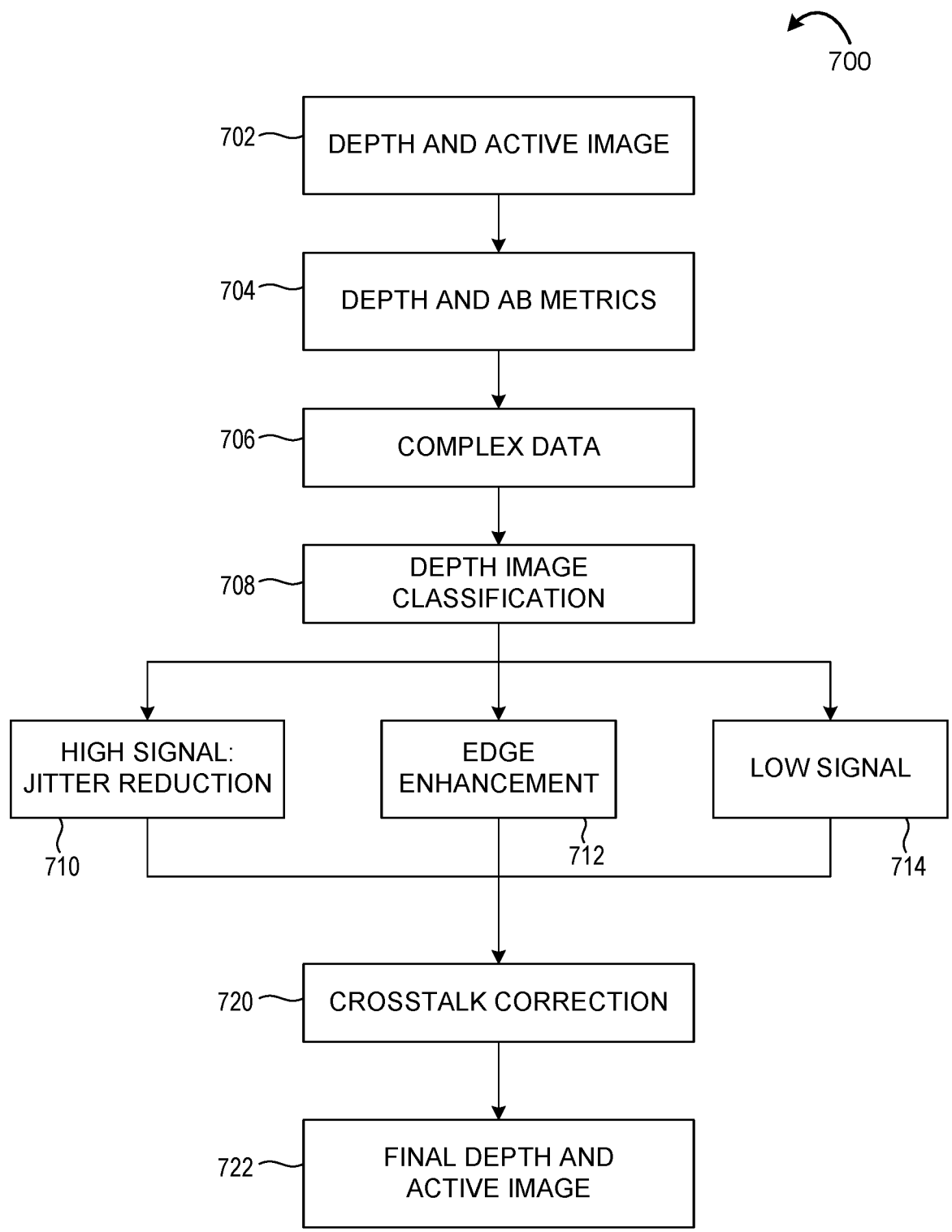
FIG. 7 shows an example processing pipeline for depth data with a signal conditioning block that uses active brightness data for segmentation.
Figure 8:
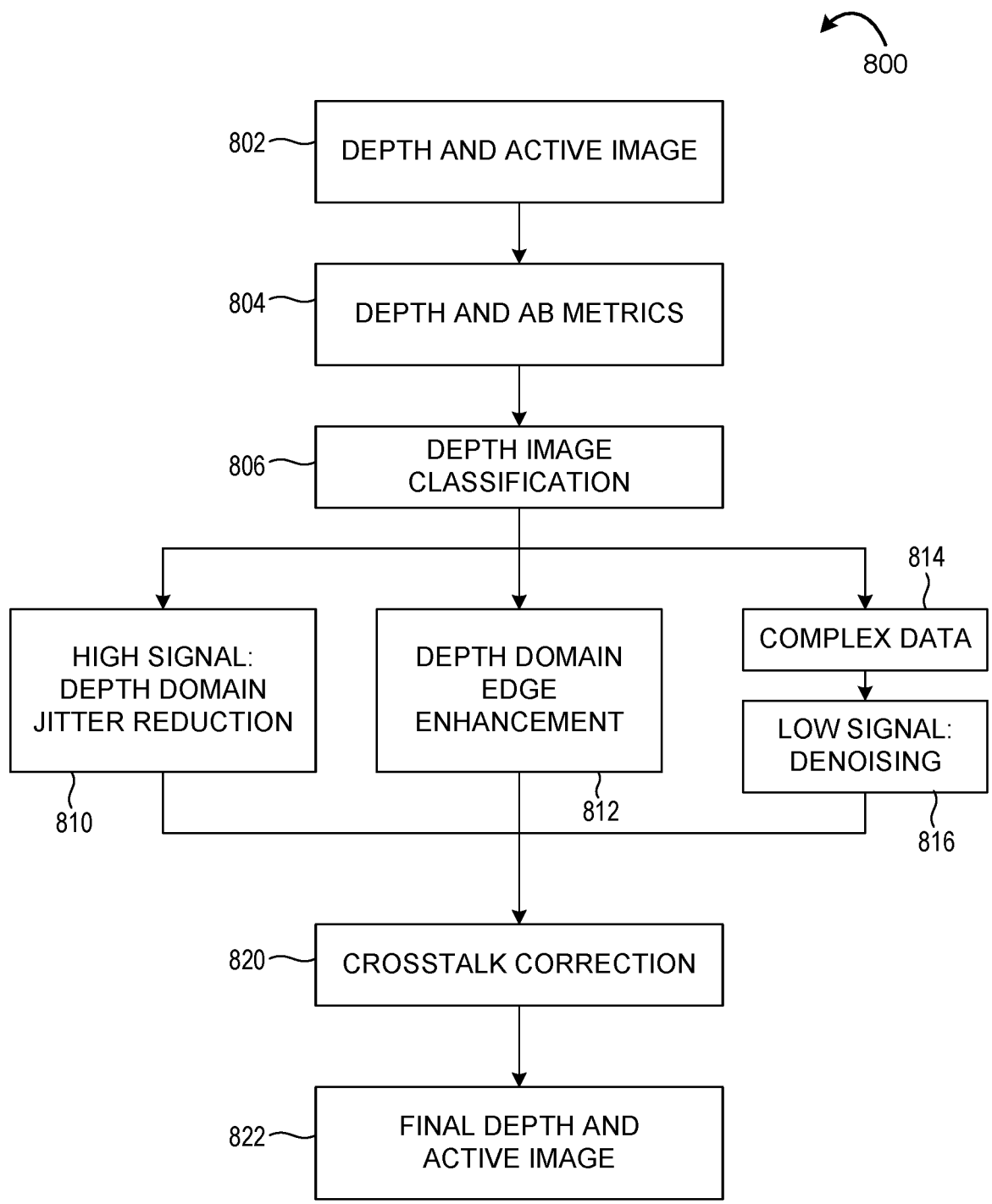
FIG. 8 shows an example processing pipeline for depth data with a signal conditioning block that uses both complex domain data and active brightness data for segmentation.

FIGS. 6-8 show example pipelines for denoising coarse depth and intensity images. The procedures outlined in FIGS. 6-8 are be performed on coarse depth and active brightness images transmitted from a depth imaging system to a computing system remote from the depth imaging system, whether to a local computing device or a cloud device. The coarse depth image comprises data within a depth domain and a complex domain. FIG. 6 shows an example where processing occurs on the depth domain data. FIG. 7 shows an example where processing occurs on the complex domain data. FIG. 8 shows an example where processing occurs on both the depth domain and complex domain data.

FIG. 6 shows a first example denoising pipeline 600 for performing depth domain processing on a coarse depth image and coarse intensity image received from a depth camera. The coarse depth and active brightness images are received at 602. Then, at 604, the depth and active brightness metrics are calculated, described in more detail above. Once the metrics are calculated, the depth image is classified (segmented by the metric) at 606. The calculated metric is used to produce the convolution coefficients and/or weighting values. Image areas may have relatively high signal to noise ratio, relatively low signal to noise ratio, or medium signal to noise ratio.

At 610, jitter reduction operations are performed on high-signal data. At 612, edge enhancement operations are performed on edge regions. At 614, denoising operations are performed on low-signal data. As described above, denoising may comprise relatively large convolutional kernels compared to jitter reduction and edge enhancement operations. Thus, segmentation may help allocate heavy compute resources for low-signal data. In the example depicted in FIG. 6, high signal areas determined by the metric may be weighted using a Gaussian filter bank with smoothing parameter depending in the local depth of the standard deviation. Edge regions are weighted using smoothing parameters, which may be small help to preserve edge information. In the medium-low SNR regime, where unwrapping errors occur at a higher rate, the maximum frequency of the number of wraps is picked as the frequency used to produce the maximum depth. Continuing with FIG.

6, denoising pipeline 600 comprises crosstalk correction at 620. Then, final depth and active brightness images are output at 622.

FIG. 7 shows another example denoising pipeline 700 for performing complex domain processing on a coarse depth image and active brightness image received from a depth camera. The coarse depth and active brightness images are received at 702. The depth and active brightness metrics are calculated at 704. Next, complex images are generated at 706 using the active brightness and coarse depth. As described above, the complex data may be reconstructed using the set of frequencies used to collect the data, or using virtual frequencies. For example, a set of virtual frequencies may be chosen to produce a more noise resilient solution by optimizing the area, volume, or hypervolume of the Voronoi cell determined by the frequencies. The coarse depth image is classified at 708, calculating the parameters that will produce the convolution coefficients of the weighted average.

Depending on the value of the metric, the pixel regions are weighted differently using a Gaussian filter bank with smoothing parameters depending on the standard deviation or variance of the local depth. At 710, jitter reduction operations are performed on high-signal data in the complex domain. At 712, edge enhancement operations are performed on edge regions. At 714, denoising operations are performed on low-signal data in the complex domain. In the case of low-signal, a larger kernel can be used for maximizing the probability of unwrapping correctly. Crosstalk correction is performed at 720 to ensure a good quality in the edges. The final depth and active brightness images are output at 722.

FIG. 8 shows an example denoising pipeline 800 for performing a combination of depth domain and complex domain processing on coarse images received from a depth camera. The coarse depth and active brightness images are received at 802. Then, at 804, the depth and active brightness metrics are calculated, described in more detail above. Once the metrics are calculated, the depth image is classified (segmented by the metric) at 806. The calculated metric is used to produce the convolution coefficients and/or weighting values.

Image areas may have relatively high signal to noise ratio, relatively low signal to noise ratio, or medium signal to noise ratio. For high-signal pixels, jitter reduction operations are performed on depth domain data at 810. For edge regions, edge enhancement operations are performed on depth domain data at 812. At 814, complex domain data is reconstructed from the coarse depth data, as described above. The complex data may be reconstructed using the set of frequencies used to collect the data, or different virtual frequencies. Then, at 816, denoising operations are performed on complex domain data of low-signal pixels. As before, a larger kernel can be used for maximizing the probability of unwrapping correctly. Finally, crosstalk correction operations are performed at 820 and the final depth and active brightness images are output at 822.

Figure 9:
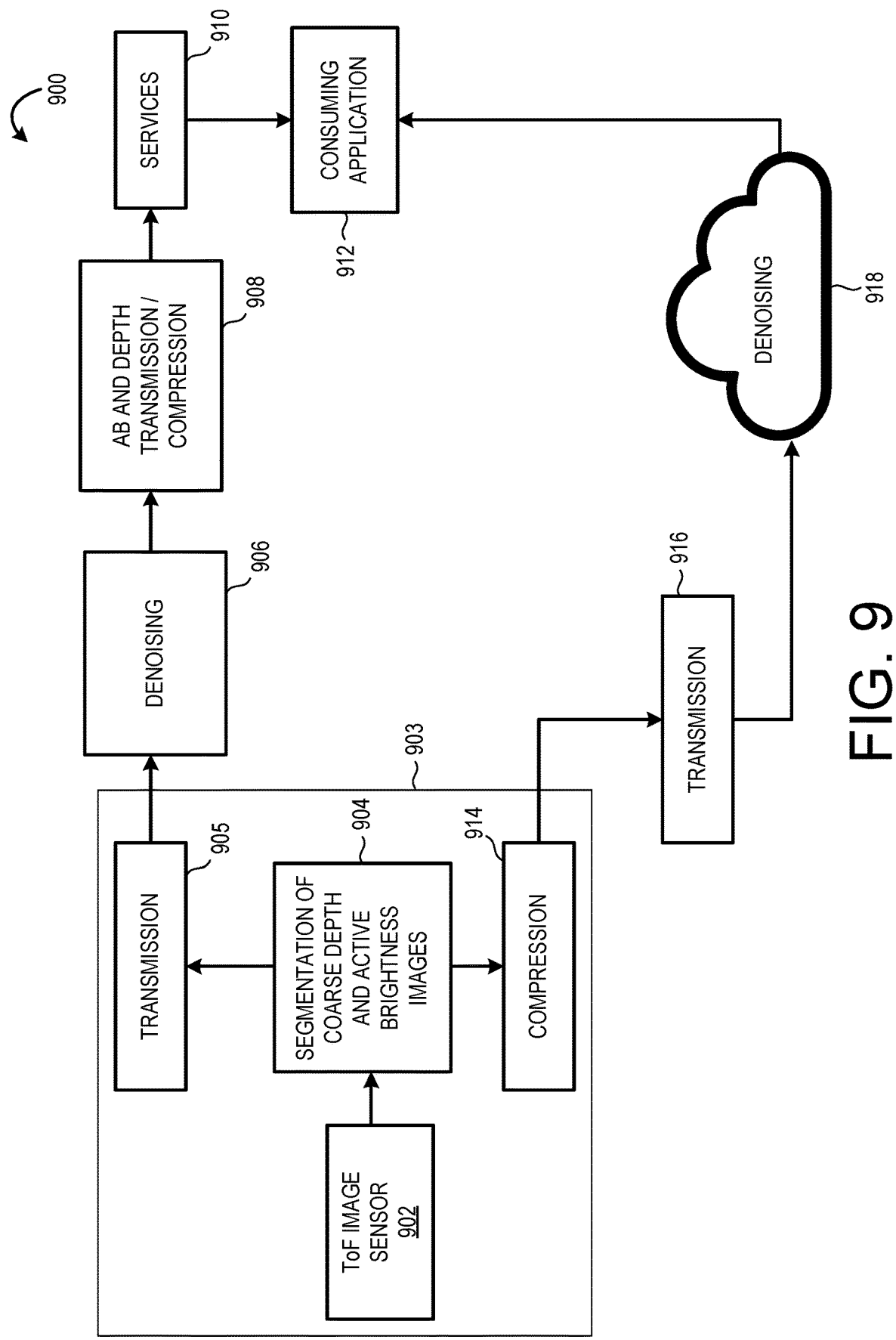
FIG. 9 schematically shows another example distributed depth engine pipeline.

In some examples, a coarse depth image (and potentially an active brightness image corresponding to the depth image) may be segmented such that some depth pixels (as well as some intensity pixels of an AB image) are processed locally on a device comprising a depth camera, while other pixels are processed remote from the device comprising the depth camera. FIG. 9 shows a block diagram of an example distributed depth engine pipeline 900 that illustrates examples of such processing pathways. ToF image sensor 902 of depth camera 903 generates a coarse depth image and an active brightness image at 904. The ToF camera 903 also segments the images to direct some pixels of depth data to cloud-based computing system 918 for more compute-intensive processing and other pixels to a local processor (e.g. local to a device with which the depth camera is integrated or for which the depth camera is a peripheral) for less compute-intensive processing (a processor of a phone, wearable device, etc.). In some instances, a coarse depth image may not be segmented, and thus processed fully locally or fully remotely, depending upon conditions applied when determining whether to segment. Example conditions are described below.

For a segmented image, a first subset of pixels is transmitted at 905 to a processor local to a device on which the depth camera 903 is located for local denoising 906 utilizing a smaller denoising kernel. The denoised pixels may optionally be compressed at 908, provided to services at 910, and/or provided to a consuming application 912. Example services include machine-learning processes and/or high-level algorithms, such as face identification, object recognition, surface reconstruction, and simultaneous localization and mapping algorithms. Other pixels of depth data from the coarse depth image can be compressed at 914 and transmitted at 916 to a cloud-based computing system 918 for remote denoising using a larger denoising kernel. The cloud-based computing system denoises those pixels of the coarse depth image (and potentially pixels of an active brightness image) to produce denoised pixels, and then provides the denoised pixels to the consuming application 912.

Figure 10:
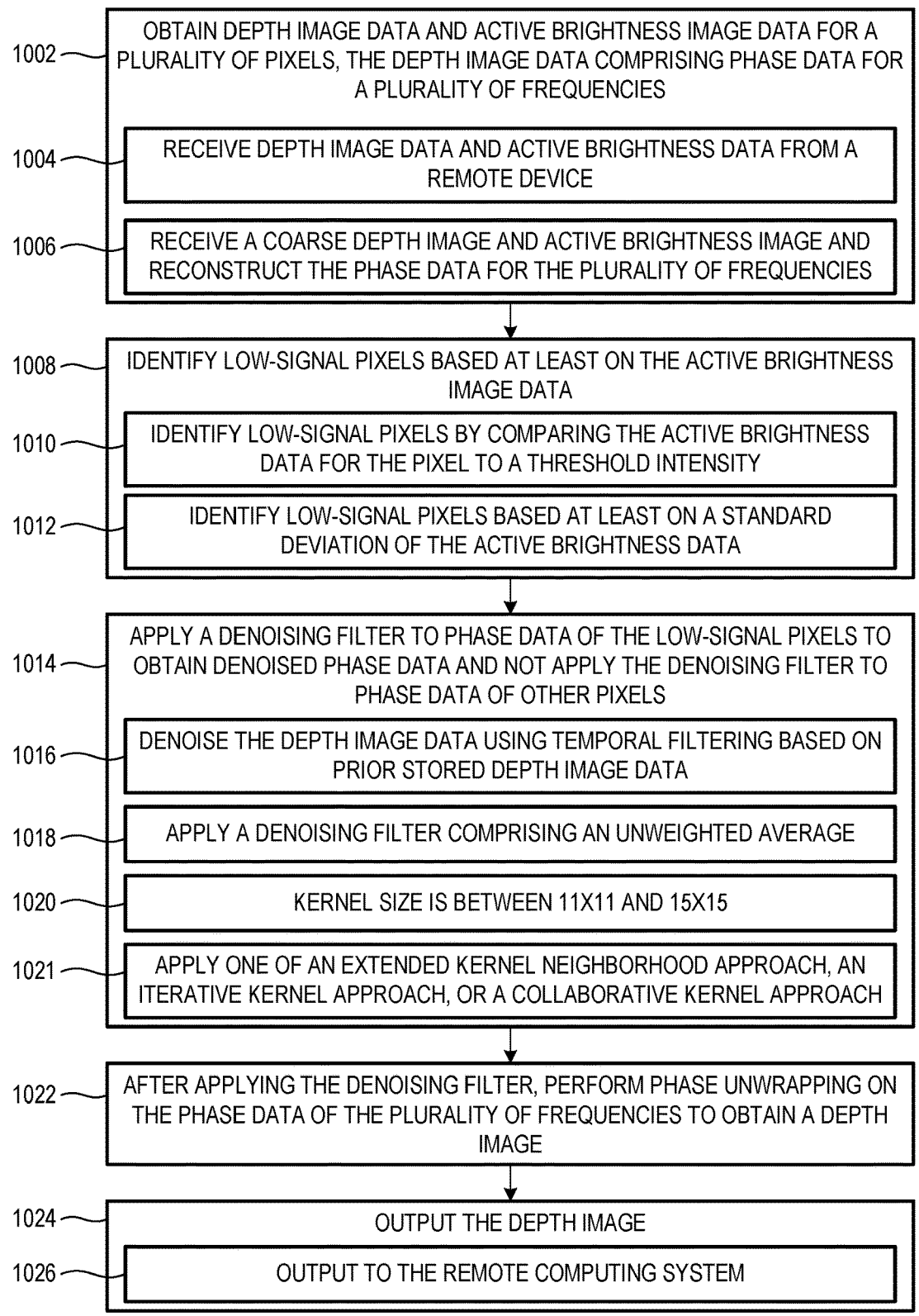
FIG. 10 shows a flow diagram of an example method for processing depth data by applying a denoising filter to low-signal pixels.

FIG. 10 is a flow diagram depicting an example method 1000 for processing depth data. At 1002, the method comprises obtaining depth image data and active brightness data for a plurality of pixels, the depth image data comprising phase data for a plurality of frequencies. In some examples, the phase data and active brightness data are obtained from a depth image sensor of a depth camera. In some examples, at 1004, the method comprises receiving the depth image data and active brightness data from a remote device, such as a depth camera that is remote to a computing system executing method 1000. Further, in some examples, at 1006, the method comprises receiving a coarse depth image and an active brightness image and reconstructing the phase data for the plurality of frequencies.

Method 1000 further comprises, at 1008, identifying low-signal pixels based at least on the active brightness image data. In some examples, at 1010, the method comprises identifying low-signal pixels by comparing the active brightness data for the pixel to a threshold intensity. In some examples, at 1012, the method comprises identifying low-signal pixels based at least on a standard deviation of the active brightness data.

Method 1000 further comprises, at 1014, applying a denoising filter to phase data of the low-signal pixels to obtain denoised phase data and not applying the denoising filter to phase data of other pixels. In some examples, at 1016, the method comprises denoising the coarse depth image data using temporal filtering based on prior stored coarse depth image data. In some examples, at 1018, the denoising filter comprises an unweighted average. In some examples, the phase data for each frequency is denoised separately. As such, method 1000 may comprise processing the phase data for the plurality of frequencies by, for each frequency of the plurality of frequencies, applying the denoising filter to phase data for the frequency. In some examples, at 1020 the denoising filter comprises a kernel having a size between 11×11 and 15×15. In some examples, at 1021, method 1000 comprising applying one of an extended kernel neighborhood approach, an iterative kernel approach, or a collaborative kernel approach to denoise the low-signal pixels.

Method 1000 further comprises, at 1022, after applying the denoising filter, performing phase unwrapping on the phase data for the plurality of frequencies to obtain a depth image. At 1024, the method further comprises outputting the depth image. In some examples, at 1026, the depth image is output to a remote computing system (e.g., cloud computing system, remote computing device, etc.). For example, the remote computing system may comprise a computing device incorporating the ToF camera from which the depth image data and active brightness data were acquired.

Figure 11:
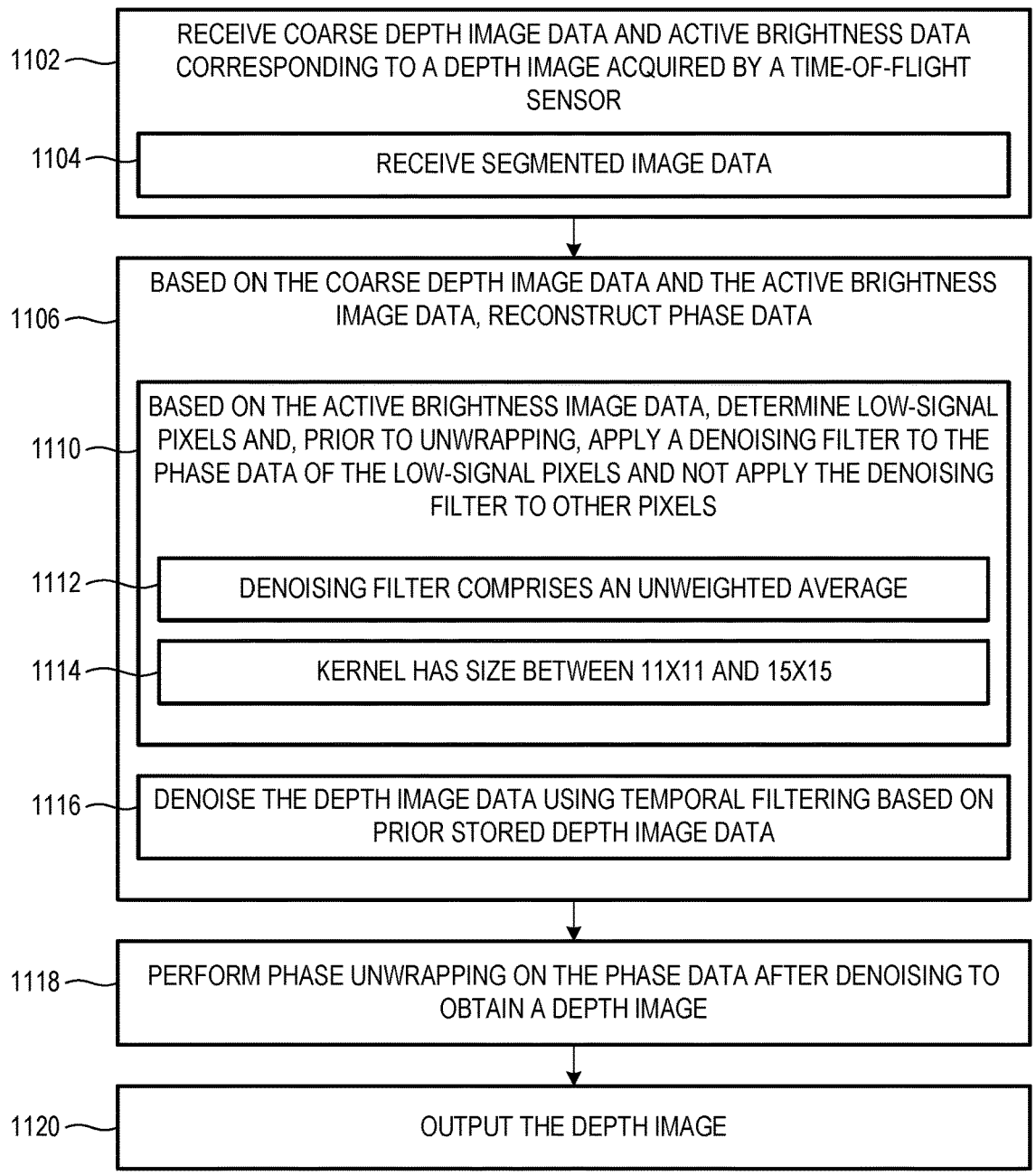
FIG. 11 shows a flow diagram of an example method for reconstructing phase data from received coarse depth image data and active brightness image data.

FIG. 11 is a flow diagram of an example method 1100 for processing depth data via reconstructing phase data from coarse depth data. At 1102, the method comprises receiving coarse depth image data and active brightness image data corresponding to a depth image acquired by a ToF camera. In some examples, at 1104, the method comprises receiving segmented image data.

Method 1100 further comprises, at 1106, based on the coarse depth image data and the active brightness image data, reconstructing phase data. Reconstructing phase data may be performed as described above regarding 508 of FIG. 5, for example. In some examples, at 1110, the method comprises, based on the active brightness image data, determining low-signal pixels and, prior to unwrapping, applying a denoising filter to the phase data of low-signal pixels and not applying the denoising filter to other pixels. In some examples, at 1112, the denoising filter comprises an unweighted average. In some examples, at 1114, the denoising kernel comprises a size between 11×11 and 15×15. In some examples, at 1116, method 1100 comprises denoising the depth image using temporal filtering based on prior stored depth image data.

Continuing, at 1118, method 1100 further comprises performing phase unwrapping on the phase data after denoising to obtain a depth image. At 1120, the method further comprises outputting the depth image. In some examples, the depth image is output together with the active brightness image. The images may be output, for example, to software applications on a remote computing system, to a device incorporating the ToF camera, or to a cloud computing system.

In some embodiments, the methods and processes described herein may be tied to a computing system of one or more computing devices. In particular, such methods and processes may be implemented as a computer-application program or service, an application-programming interface (API), a library, and/or other computer-program product.

Figure 12:
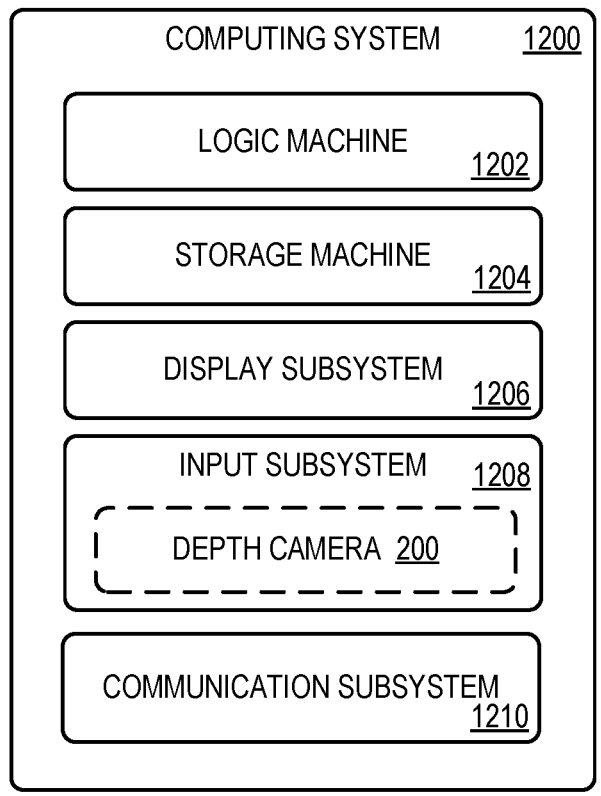
FIG. 12 shows a block diagram of an example computing system.

FIG. 12 schematically shows a non-limiting embodiment of a computing system 1200 that can enact one or more of the methods and processes described above. Computing system 1200 is shown in simplified form. Computing system 1200 may take the form of one or more personal computers, server computers, tablet computers, home-entertainment computers, network computing devices, gaming devices, mobile computing devices, mobile communication devices (e.g., smart phone), and/or other computing devices.

Computing system 1200 includes a logic machine 1202 and a storage machine 1204. Computing system 1200 may optionally include a display subsystem 1206, input subsystem 1208, communication subsystem 1210, and/or other components not shown in FIG. 12.

Logic machine 1202 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1204 includes one or more physical devices configured to hold instructions executable by the logic machine to implement the methods and processes described herein. When such methods and processes are implemented, the state of storage machine 1204 may be transformed—e.g., to hold different data.

Storage machine 1204 may include removable and/or built-in devices. Storage machine 1204 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1204 may include volatile, nonvolatile, dynamic, static, read/write, read-only, random-access, sequential-access, location-addressable, file-addressable, and/or content-addressable devices.

It will be appreciated that storage machine 1204 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1202 and storage machine 1204 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1200 implemented to perform a particular function. In some cases, a module, program, or engine may be instantiated via logic machine 1202 executing instructions held by storage machine 1204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1206 may be used to present a visual representation of data held by storage machine 1204. This visual representation may take the form of a graphical user interface (GUI). As the herein described methods and processes change the data held by the storage machine, and thus transform the state of the storage machine, the state of display subsystem 1206 may likewise be transformed to visually represent changes in the underlying data. Display subsystem 1206 may include one or more display devices utilizing virtually any type of technology. Such display devices may be combined with logic machine 1202 and/or storage machine 1204 in a shared enclosure, or such display devices may be peripheral display devices.

When included, input subsystem 1208 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera (e.g., depth camera 200) for machine vision and/or gesture recognition; a head tracker, eye tracker, accelerometer, and/or gyroscope for motion detection and/or intent recognition; as well as electric-field sensing componentry for assessing brain activity.

When included, communication subsystem 1210 may be configured to communicatively couple computing system 1200 with one or more other computing devices, such as a remote computing system which may comprise a cloud computing system, an enterprise system, a depth camera device, or a networked PC, as examples. Communication subsystem 1210 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1200 to send and/or receive messages to and/or from other devices via a network such as the Internet.

Another example provides a computing system comprising a logic machine, and a storage machine holding instructions executable by the logic machine to process depth data by obtaining depth image data and active brightness image data for a plurality of pixels, the depth image data comprising phase data for a plurality of frequencies, identifying low-signal pixels based at least on the active brightness image data, applying a denoising filter to phase data of the low-signal pixels to obtain denoised phase data and not applying the denoising filter to phase data of other pixels, after applying the denoising filter, performing phase unwrapping on the phase data for the plurality of frequencies to obtain a depth image, and outputting the depth image. In some such examples, the computing device is a time-of-flight (ToF) camera comprising a ToF image sensor, and the phase data for the plurality of frequencies is acquired by the ToF image sensor. In some such examples, the computing system is remote from a depth camera from which coarse depth image data and the active brightness image data are received, the phase data for the plurality of frequencies is reconstructed from the coarse depth image data and the active brightness data. In some such examples, the instructions are alternatively or additionally further executable to denoise the coarse depth image data using temporal filtering based on prior stored coarse depth image data. In some such examples, the instructions are alternatively or additionally executable to process the phase data for the plurality of frequencies by, for each frequency of the plurality of frequencies, applying the denoising filter to phase data for the frequency. In some such examples, the denoising filter alternatively or additionally comprises an unweighted average. In some such examples, the filter alternatively or additionally comprises a kernel having a size between 11×11 and 15×15. In some such examples, the instructions alternatively or additionally are executable to identify low-signal pixels by comparing the active brightness image data for the pixel to a threshold intensity. In some such examples, the instructions alternatively or additionally are executable to identify low-signal pixels based at least on a standard deviation of the active brightness image data.

Another example provides a computing system comprising a logic machine, and a storage machine holding instructions executable by the logic machine to receive coarse depth image data and active brightness image data corresponding to a depth image acquired by a time-of-flight image sensor, based on the coarse depth image data and the active brightness image data, reconstruct phase data, apply a denoising filter to the phase data, perform phase unwrapping on the phase data after denoising to obtain a depth image, and output the depth image. In some such examples, the instructions are executable to reconstruct the phase data by using $\tilde{S}(m,n,k)=\widetilde{AB}(m,n)e^{i\tilde{\phi}(m,n,k)}$, where $\tilde{S}$ is reconstructed phase data at a pixel (m,n) and frequency k, $\widetilde{AB}$ is the active brightness image data corresponding to the pixel, and $\tilde{\phi}$ is the phase of the pixel from the coarse depth image data. In some such examples, the instructions alternatively or additionally are executable to, based on the active brightness data, determine low-signal pixels, and, prior to phase unwrapping, apply a denoising filter to the phase data of the low-signal pixels and not apply the denoising filter to other pixels. In some such examples, the denoising filter alternatively or additionally comprises an unweighted average. In some such examples, the denoising filter alternatively or additionally comprises a kernel having a size between 11×11 and 15×15. In some such examples, the coarse depth image data comprises coarse depth data of low-signal pixels corresponding to a segmented depth image. In some such examples, the instructions alternatively or additionally are executable to output the depth image to a remote computing device from which the coarse depth image data and the active brightness image data were received.

Another example provides a method for processing depth image data comprising obtaining depth image data and active brightness data for a plurality of pixels, the depth data comprising phase data for a plurality of frequencies, identifying low-signal pixels based at least on the active brightness image data, applying a denoising filter to phase data of the low-signal pixels to obtain denoised phase data and not applying the denoising filter to phase data from other pixels, after applying the denoising filter, performing phase unwrapping on the phase data for the plurality of frequencies to obtain a depth image, and outputting the depth image. In some such examples, identifying low-signal pixels comprises comparing active brightness data for a pixel. In some such examples, the denoising filter alternatively or additionally comprises an unweighted average. In some such examples, applying the denoising filter alternatively or additionally comprises applying one of an extended kernel neighborhood approach, an iterative kernel approach, or a collaborative kernel approach.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
a logic machine; and
a storage machine holding instructions executable by the logic machine to process depth data by
obtaining depth image data and active brightness image data for a plurality of pixels, the depth image data comprising phase data for a plurality of frequencies,
identifying low-signal pixels based at least on the active brightness image data,
applying a spatial denoising filter to phase data of the low-signal pixels to obtain denoised phase data and not applying the spatial denoising filter to phase data of other pixels,
after applying the spatial denoising filter, performing phase unwrapping on the phase data for the plurality of frequencies to obtain a depth image, and
outputting the depth image.

2. The computing system of claim 1, wherein the computing device is a time-of-flight (ToF) camera comprising a ToF image sensor, and wherein the phase data for the plurality of frequencies is acquired by the ToF image sensor.

3. The computing system of claim 1, wherein the computing system is remote from a depth camera from which coarse depth image data and the active brightness image data are received, and wherein the phase data for the plurality of frequencies is reconstructed from the coarse depth image data and the active brightness data.

4. The computing system of claim 3, wherein the instructions are further executable to denoise the coarse depth image data using temporal filtering based on prior stored coarse depth image data.

5. The computing system of claim 1, wherein the instructions are executable to process the phase data for the plurality of frequencies by, for each frequency of the plurality of frequencies, applying the spatial denoising filter to phase data for the frequency.

6. The computing system of claim 1, wherein the spatial denoising filter comprises an unweighted average.

7. The computing system of claim 1, wherein the spatial denoising filter comprises a kernel having a size between 11×11 and 15×15.

8. The computing system of claim 1, wherein the instructions are executable to identify low-signal pixels by comparing the active brightness image data for the pixel to a threshold intensity.

9. The computing system of claim 1, wherein the instructions are executable to identify low-signal pixels based at least on a standard deviation of the active brightness image data.

10. A computing system comprising:
a logic machine; and
a storage machine holding instructions executable by the logic machine to:
receive coarse depth image data and active brightness image data corresponding to a depth image acquired by a time-of-flight image sensor,
based on the coarse depth image data and the active brightness image data, reconstruct phase data,
apply a spatial denoising filter to the phase data,
perform phase unwrapping on the phase data after applying the spatial denoising filter to obtain a depth image, and
output the depth image.

11. The computing system of claim 10, wherein the instructions are executable to reconstruct the phase data by using $$\tilde{S}(m,n,k) = \widetilde{AB}(m,n) e^{i\tilde{\phi}(m,n,k)}$$

where $\tilde{S}$ is reconstructed phase data at a pixel (m,n) and frequency k, $\widetilde{AB}$ is the active brightness image data corresponding to the pixel, and $\tilde{\phi}$ is the phase of the pixel from the coarse depth image data.

12. The computing system of claim 10, wherein the instructions are executable to, based on the active brightness data, determine low-signal pixels, and, prior to phase unwrapping, apply the spatial denoising filter to the phase data of the low-signal pixels and not apply the spatial denoising filter to other pixels.

13. The computing system of claim 12, wherein the spatial denoising filter comprises an unweighted average.

14. The computing system of claim 13, wherein the spatial denoising filter comprises a kernel having a size between 11×11 and 15×15.

15. The computing system of claim 10, wherein the coarse depth image data comprises coarse depth data of low-signal pixels corresponding to a segmented depth image.

16. The computing system of claim 10, wherein the instructions are executable to output the depth image to a remote computing device from which the coarse depth image data and the active brightness image data were received.

17. A method for processing depth image data comprising:
obtaining depth image data and active brightness data for a plurality of pixels, the depth data comprising phase data for a plurality of frequencies;
identifying low-signal pixels based at least on the active brightness image data;
applying a spatial denoising filter to phase data of the low-signal pixels to obtain denoised phase data and not applying the spatial denoising filter to phase data from other pixels;
after applying the spatial denoising filter, performing phase unwrapping on the phase data for the plurality of frequencies to obtain a depth image; and
outputting the depth image.

18. The method of claim 17, wherein identifying low-signal pixels comprises comparing active brightness data for a pixel.

19. The method of claim 17, wherein the spatial denoising filter comprises an unweighted average.

20. The method of claim 17, wherein applying the spatial denoising filter comprises applying one of an extended kernel neighborhood approach, an iterative kernel approach, or a collaborative kernel approach.

\* \* \* \* \*